US00RE48845E

(19) United States
(12) Reissued Patent
MacInnis et al.

(10) Patent Number: US RE48,845 E
(45) Date of Reissued Patent: *Dec. 7, 2021

(54) VIDEO DECODING SYSTEM SUPPORTING MULTIPLE STANDARDS

(71) Applicant: Broadcom Corporation, San Jose, CA (US)

(72) Inventors: Alexander G. MacInnis, Los Altos, CA (US); Jose' R. Alvarez, Sunnyvale, CA (US); Sheng Zhong, Santa Clara, CA (US); Xiaodong Xie, Freemont, CA (US); Vivian Hsiun, Palo Alto, CA (US)

(73) Assignee: Broadcom Corporation, San Jose, CA (US)

( * ) Notice: This patent is subject to a terminal disclaimer.

(21) Appl. No.: 16/103,107

(22) Filed: Aug. 14, 2018

Related U.S. Patent Documents

Reissue of:
(64) Patent No.: 9,417,883
Issued: Aug. 16, 2016
Appl. No.: 13/608,221
Filed: Sep. 10, 2012

U.S. Applications:
(62) Division of application No. 10/114,798, filed on Apr. 1, 2002, now Pat. No. 8,284,844.

(51) Int. Cl.
*G06F 9/38* (2018.01)
*H04N 19/12* (2014.01)
(Continued)

(52) U.S. Cl.
CPC ..... *G06F 9/3861* (2013.01); *G06F 9/3877* (2013.01); *H04N 19/12* (2014.11);
(Continued)

(58) Field of Classification Search
CPC ..... G06F 9/3816; G06F 9/3877; H04N 19/12; H04N 19/129; H04N 19/157;
(Continued)

(56) References Cited

U.S. PATENT DOCUMENTS 5,212,777 A 5/1993 Gove et al.
5,239,654 A 8/1993 Ing-Simmons et al.
(Continued)

FOREIGN PATENT DOCUMENTS

EP 0367182 A2 5/1990
EP 0537932 A2 4/1993
(Continued)

OTHER PUBLICATIONS

Complainant Broadcom Corporation's Initial Claim Construction Brief, *In the Matter of Certain Semiconductor Devices and Consumer Audiovisual Products Containing the Same*, ITC Investigation No. 337-TA-1047, see pp. ii, vii, and 5-12; Aug. 17, 2017; 53 pages.
(Continued)

*Primary Examiner* — Woo H Choi
(74) *Attorney, Agent, or Firm* — Adsero IP

(57) ABSTRACT

System and method for decoding digital video data. The decoding system employs hardware accelerators that assist a core processor in performing selected decoding tasks. The hardware accelerators are configurable to support a plurality of existing and future encoding/decoding formats. The accelerators are configurable to support substantially any existing or future encoding/decoding formats that fall into the general class of DCT-based, entropy decoded, block-motion-compensated compression algorithms. The hardware accelerators illustratively comprise a programmable entropy decoder, an inverse quantization module, a inverse discrete cosine transform module, a pixel filter, a motion compensation module and a de-blocking filter. The hardware accelerators function in a decoding pipeline wherein at any given stage in the pipeline, while a given function is being performed on a given macroblock, the next macroblock in
(Continued)

the data stream is being worked on by the previous function in the pipeline.

19 Claims, 9 Drawing Sheets

(51) Int. Cl.

| | |
|---|---|
| ***H04N 19/122*** | (2014.01) |
| ***H04N 19/129*** | (2014.01) |
| ***H04N 19/157*** | (2014.01) |
| ***H04N 19/176*** | (2014.01) |
| ***H04N 19/423*** | (2014.01) |
| ***H04N 19/44*** | (2014.01) |
| ***H04N 19/60*** | (2014.01) |
| ***H04N 19/61*** | (2014.01) |
| ***H04N 19/625*** | (2014.01) |
| ***H04N 19/70*** | (2014.01) |
| ***H04N 19/82*** | (2014.01) |
| ***H04N 19/90*** | (2014.01) |
| ***H04N 19/91*** | (2014.01) |

(52) U.S. Cl.
CPC ..... *H04N 19/122* (2014.11); *H04N 19/129* (2014.11); *H04N 19/157* (2014.11); *H04N 19/176* (2014.11); *H04N 19/423* (2014.11); *H04N 19/44* (2014.11); *H04N 19/60* (2014.11); *H04N 19/61* (2014.11); *H04N 19/625* (2014.11); *H04N 19/70* (2014.11); *H04N 19/82* (2014.11); *H04N 19/90* (2014.11); *H04N 19/91* (2014.11)

(58) Field of Classification Search
CPC .... H04N 19/176; H04N 19/423; H04N 19/44; H04N 19/60; H04N 19/61; H04N 19/625; H04N 19/70; H04N 19/82; H04N 19/90; H04N 19/91
See application file for complete search history.

(56) References Cited

U.S. PATENT DOCUMENTS 5,269,001 A 12/1993 Guttag
5,379,351 A 1/1995 Fandrianto et al.
5,379,356 A 1/1995 Purcell et al.
5,386,233 A 1/1995 Keith
5,432,900 A 7/1995 Rhodes et al.
5,488,419 A 1/1996 Hui et al.
5,506,604 A 4/1996 Nally et al.
5,508,746 A 4/1996 Lim
5,512,962 A 4/1996 Homma
5,528,528 A 6/1996 Bui
5,568,167 A 10/1996 Galbi et al.
5,576,765 A 11/1996 Cheney et al.
5,579,052 A 11/1996 Artieri
5,589,886 A 12/1996 Ezaki
5,592,399 A 1/1997 Keith et al.
5,594,679 A 1/1997 Iwata
5,594,813 A 1/1997 Fandrianto et al.
5,598,483 A 1/1997 Purcell et al.
5,598,514 A 1/1997 Purcell et al.
5,604,540 A 2/1997 Howe
5,610,657 A 3/1997 Zhang
5,614,952 A 3/1997 Boyce et al.
5,623,311 A 4/1997 Phillips et al.
5,625,571 A 4/1997 Claydon
5,633,687 A 5/1997 Bhayani et al.
5,638,128 A 6/1997 Hoogenboom et al.
5,640,543 A 6/1997 Farrell et al.
5,650,823 A 7/1997 Ngai et al.
5,666,170 A 9/1997 Stewart
5,675,424 A 10/1997 Park
5,684,534 A 11/1997 Harney et al.
5,699,460 A 12/1997 Kopet et al.
5,703,658 A 12/1997 Tsuru et al.
5,708,511 A 1/1998 Gandhi et al.
5,712,799 A 1/1998 Farmwald et al.
5,742,892 A 4/1998 Chaddha
5,748,979 A 5/1998 Trimberger
5,754,240 A 5/1998 Wilson
5,757,670 A 5/1998 Ti et al.
5,768,429 A 6/1998 Jabbi et al.
5,774,206 A 6/1998 Wasserman et al.
5,778,241 A 7/1998 Bindloss et al.
5,784,572 A 7/1998 Rostoker et al.
5,790,712 A 8/1998 Fandrianto et al.
5,802,315 A 9/1998 Uchiumi et al.
5,805,148 A 9/1998 Swamy et al.
5,805,228 A 9/1998 Proctor et al.
5,809,174 A 9/1998 Purcell et al.
5,809,270 A 9/1998 Robbins
5,809,275 A 9/1998 Lesartre
5,812,562 A 9/1998 Baeg
5,812,789 A 9/1998 Diaz et al.
5,815,206 A 9/1998 Malladi et al.
5,818,532 A 10/1998 Malladi et al.
5,818,967 A 10/1998 Bhattacharjee
5,825,424 A 10/1998 Canfield et al.
5,838,664 A 11/1998 Polomski
5,838,729 A 11/1998 Hu et al.
5,844,616 A 12/1998 Collet et al.
5,845,083 A 12/1998 Hamadani et al.
5,870,087 A 2/1999 Chau
5,870,435 A 2/1999 Choi et al.
5,870,497 A 2/1999 Galbi et al.
5,872,597 A 2/1999 Yamakage et al.
5,889,949 A 3/1999 Charles
5,892,966 A 4/1999 Petrick et al.
5,896,176 A 4/1999 Das et al.
5,901,248 A 5/1999 Fandrianto et al.
5,909,559 A 6/1999 So
5,920,353 A 7/1999 Diaz et al.
5,923,665 A 7/1999 Sun et al.
5,926,208 A 7/1999 Noonen et al.
5,959,689 A 9/1999 De Lange et al.
5,973,740 A 10/1999 Hrusecky
5,973,755 A 10/1999 Gabriel
5,978,592 A 11/1999 Wise
5,982,459 A 11/1999 Fandrianto et al.
5,990,812 A 11/1999 Bakhmutsky
5,995,513 A 11/1999 Harrand et al.
6,002,410 A 12/1999 Battle
6,002,441 A 12/1999 Bheda et al.
6,005,546 A 12/1999 Keene
6,014,512 A 1/2000 Mohamed et al.
6,026,195 A 2/2000 Eifrig et al.
6,028,635 A 2/2000 Owen et al.
6,038,380 A 3/2000 Wise et al.
6,041,400 A 3/2000 Ozcelik et al.
6,047,112 A 4/2000 Wise et al.
6,052,415 A 4/2000 Carr et al.
6,058,459 A 5/2000 Owen et al.
6,061,711 A 5/2000 Song et al.
6,067,098 A 5/2000 Dye
6,072,830 A 6/2000 Proctor et al.
6,081,622 A 6/2000 Carr et al.
6,091,778 A 7/2000 Sporer et al.
6,101,276 A 8/2000 Adiletta et al.
6,104,751 A 8/2000 Artieri
6,104,861 A 8/2000 Tsukagoshi
6,124,882 A 9/2000 Voois et al.
6,125,398 A 9/2000 Mirashrafi et al.
6,128,015 A 10/2000 Zenda
6,130,963 A 10/2000 Uz et al.
6,137,537 A 10/2000 Tsuji et al.
6,144,323 A 11/2000 Wise
6,160,584 A 12/2000 Yanagita
6,167,089 A 12/2000 Boyce et al.
6,167,157 A 12/2000 Sugahara
6,175,592 B1 1/2001 Kim et al.
6,175,594 B1 1/2001 Strasser et al.

(56) References Cited

U.S. PATENT DOCUMENTS 6,184,935 B1 2/2001 Iaquinto et al.
6,191,842 B1 2/2001 Navarro
6,192,073 B1 2/2001 Reader et al.
6,195,593 B1 2/2001 Nguyen
6,205,176 B1 3/2001 Sugiyama
6,209,078 B1 3/2001 Chiang et al.
6,211,800 B1 4/2001 Yanagihara et al.
6,222,467 B1 4/2001 Moon
6,223,274 B1 4/2001 Catthoor et al.
6,240,516 B1 5/2001 Vainsencher
6,246,347 B1 6/2001 Bakhmutsky
6,263,019 B1 7/2001 Ryan
6,266,373 B1 7/2001 Bakhmutsky et al.
6,268,886 B1 7/2001 Choi
6,278,478 B1 8/2001 Ferriere
6,282,243 B1 8/2001 Kazui et al.
6,289,138 B1 9/2001 Yip et al.
6,295,089 B1 9/2001 Hoang
6,301,304 B1 10/2001 Jing et al.
6,330,666 B1 12/2001 Wise et al.
6,339,616 B1 1/2002 Kovalev
6,341,375 B1 1/2002 Watkins
6,348,925 B1 2/2002 Potu
6,369,855 B1 4/2002 Chauvel et al.
6,389,071 B1 5/2002 Wilson
6,389,076 B2 5/2002 Bakhmutsky et al.
6,414,687 B1 7/2002 Gibson
6,414,996 B1 7/2002 Owen et al.
6,421,698 B1 7/2002 Hong
6,425,054 B1 7/2002 Nguyen
6,441,842 B1 8/2002 Fandrianto et al.
6,441,860 B1 8/2002 Yamaguchi et al.
6,452,639 B1 9/2002 Wagner et al.
6,459,737 B1 10/2002 Jiang
6,469,743 B1 10/2002 Cheney et al.
6,525,783 B1 2/2003 Kim et al.
6,526,430 B1 2/2003 Hung et al.
6,529,632 B1 3/2003 Nakaya et al.
6,538,656 B1 3/2003 Cheung et al.
6,539,059 B1 3/2003 Sriram et al.
6,539,120 B1 3/2003 Sita et al.
6,542,541 B1 4/2003 Luna et al.
6,553,072 B1 4/2003 Chiang et al.
6,557,156 B1 4/2003 Guccione
6,560,367 B1 5/2003 Nakaya
6,567,557 B1 5/2003 Sigmund
6,570,579 B1 5/2003 MacInnis et al.
6,570,926 B1 5/2003 Agrawal et al.
6,573,905 B1 6/2003 MacInnis et al.
6,580,830 B1 6/2003 Sato et al.
6,594,396 B1 7/2003 Yoshida et al.
6,606,126 B1 8/2003 Lim et al.
6,630,964 B2 10/2003 Burns et al.
6,631,214 B1 10/2003 Nakaya
6,636,222 B1 10/2003 Valmiki et al.
6,647,061 B1 * 11/2003 Panusopone ..... H04N 21/23439 375/240.12
6,658,056 B1 12/2003 Duruöz et al.
6,661,422 B1 12/2003 Valmiki et al.
6,665,346 B1 12/2003 Lee et al.
6,674,536 B2 1/2004 Long et al.
6,697,930 B2 2/2004 Wise et al.
6,714,593 B1 3/2004 Benzler et al.
6,757,330 B1 6/2004 Hsu
6,760,833 B1 7/2004 Dowling
6,768,774 B1 7/2004 MacInnis et al.
6,771,196 B2 8/2004 Hsiun
6,781,601 B2 8/2004 Cheung
6,788,347 B1 9/2004 Kim et al.
6,792,048 B1 9/2004 Lee et al.
6,798,420 B1 9/2004 Xie
6,829,303 B1 12/2004 Pearlstein et al.
6,833,875 B1 12/2004 Yang et al.
6,842,124 B2 1/2005 Penna
6,842,219 B2 1/2005 Lee
6,842,844 B1 1/2005 Fadavi-Ardekani et al.
6,853,385 B1 2/2005 MacInnis
6,862,278 B1 3/2005 Chang et al.
6,862,325 B2 3/2005 Gay-Bellile et al.
6,870,538 B2 3/2005 MacInnis et al.
6,885,319 B2 4/2005 Geiger et al.
6,901,153 B1 5/2005 Leone
6,909,744 B2 6/2005 Molloy
6,930,689 B1 8/2005 Giacalone et al.
6,944,226 B1 9/2005 Lin et al.
6,963,613 B2 11/2005 MacInnis et al.
6,968,008 B1 11/2005 Ribas-Corbera et al.
6,975,324 B1 12/2005 Valmiki et al.
6,993,191 B2 1/2006 Petrescu
7,034,897 B2 4/2006 Alvarez et al.
7,071,944 B2 7/2006 MacInnis et al.
7,095,341 B2 8/2006 Hsiun
7,095,783 B1 8/2006 Sotheran et al.
7,110,006 B2 9/2006 MacInnis et al.
7,110,456 B2 9/2006 Sekiguchi et al.
7,116,372 B2 10/2006 Kondo et al.
7,149,811 B2 12/2006 Wise et al.
7,151,800 B1 12/2006 Luna et al.
7,167,108 B2 1/2007 Chu et al.
7,181,070 B2 2/2007 Petrescu et al.
7,224,733 B1 5/2007 Benzler et al.
7,257,641 B1 8/2007 VanBuskirk et al.
7,277,099 B2 10/2007 Valmiki et al.
7,295,614 B1 11/2007 Shen et al.
7,310,104 B2 12/2007 MacInnis et al.
7,342,967 B2 3/2008 Aggarwal et al.
7,446,774 B1 11/2008 MacInnis et al.
7,548,586 B1 6/2009 Mimar
7,581,239 B1 8/2009 Watkins
7,590,059 B2 9/2009 Gordon
7,634,011 B2 12/2009 Sullivan
7,649,943 B2 1/2010 Speed et al.
7,668,242 B2 2/2010 Sullivan et al.
7,711,938 B2 5/2010 Wise et al.
7,792,191 B2 9/2010 Kwon
7,848,430 B2 12/2010 Valmiki et al.
7,899,123 B2 3/2011 Xue et al.
7,991,049 B2 8/2011 MacInnis et al.
8,068,171 B2 11/2011 Aggarwal et al.
8,189,678 B2 5/2012 Valmiki et al.
8,284,844 B2 10/2012 MacInnis et al.
8,390,635 B2 3/2013 MacInnis et al.
8,659,608 B2 2/2014 MacInnis et al.
8,913,667 B2 12/2014 Hsiun et al.
9,329,871 B2 5/2016 MacInnis et al.
9,417,883 B2 8/2016 MacInnis et al.
2001/0005432 A1 6/2001 Takahashi et al.
2001/0014166 A1 8/2001 Hong
2001/0022816 A1 9/2001 Bakhmutsky et al.
2001/0026587 A1 10/2001 Hashimoto et al.
2001/0028680 A1 10/2001 Gobert
2001/0033617 A1 10/2001 Karube et al.
2001/0046260 A1 11/2001 Molloy
2001/0046264 A1 11/2001 Fandrianto et al.
2002/0034252 A1 3/2002 Owen et al.
2002/0047919 A1 4/2002 Kondo et al.
2002/0057446 A1 5/2002 Long et al.
2002/0057739 A1 5/2002 Hasebe et al.
2002/0065952 A1 5/2002 Sullivan et al.
2002/0071490 A1 6/2002 Tsuboi
2002/0085021 A1 * 7/2002 Sullivan ..... H04N 21/25808 715/716
2002/0085768 A1 7/2002 Yokose et al.
2002/0095689 A1 7/2002 Novak
2002/0118758 A1 8/2002 Sekiguchi et al.
2002/0150159 A1 10/2002 Zhong
2002/0172288 A1 11/2002 Kwon
2003/0021344 A1 1/2003 Panusopone et al.
2003/0079035 A1 4/2003 Boyd et al.
2003/0112864 A1 6/2003 Karczewicz et al.
2003/0156652 A1 8/2003 Wise et al.
2003/0174774 A1 9/2003 Mock et al.
2003/0187662 A1 10/2003 Wilson
2003/0222998 A1 12/2003 Yamauchi et al.

(56) References Cited

U.S. PATENT DOCUMENTS

| | | | |
|---|---|---|---|
| 2003/0235251 | A1 | 12/2003 | Hsiun et al. |
| 2004/0008788 | A1 | 1/2004 | Kono et al. |
| 2004/0028141 | A1 | 2/2004 | Hsiun et al. |
| 2004/0039903 | A1 | 2/2004 | Wise et al. |
| 2004/0120404 | A1 | 6/2004 | Sugahara et al. |
| 2004/0233332 | A1 | 11/2004 | Takashimizu et al. |
| 2005/0094729 | A1 | 5/2005 | Yuan et al. |
| 2006/0126962 | A1 | 6/2006 | Sun |
| 2015/0195535 | A1 | 7/2015 | Xue et al. |

FOREIGN PATENT DOCUMENTS

| | | | |
|---|---|---|---|
| EP | 0572262 | A2 | 12/1993 |
| EP | 0615206 | A1 | 9/1994 |
| EP | 0663762 | | 7/1995 |
| EP | 0663762 | A2 | 7/1995 |
| EP | 0884910 | A1 | 12/1998 |
| EP | 0663762 | B1 | 2/1999 |
| EP | 0945001 | B1 | 9/1999 |
| EP | 0884910 | B1 | 5/2001 |
| EP | 1124181 | A1 | 8/2001 |
| EP | 0947092 | B1 | 5/2003 |
| EP | 3007419 | A1 | 4/2016 |
| JP | H05-053803 | A | 3/1993 |
| JP | H05-100850 | A | 4/1993 |
| JP | H05-204640 | A | 8/1993 |
| JP | H05-225153 | A | 9/1993 |
| JP | H05-268482 | A | 10/1993 |
| JP | H06-030442 | A | 2/1994 |
| JP | H06-180753 | A | 6/1994 |
| JP | H06-187434 | A | 7/1994 |
| JP | H06-214749 | A | 8/1994 |
| JP | 06-292178 | A | 10/1994 |
| JP | H06-301534 | A | 10/1994 |
| JP | H06-326615 | A | 11/1994 |
| JP | H06-326996 | A | 11/1994 |
| JP | H07-131785 | A | 5/1995 |
| JP | 08-050575 | A | 2/1996 |
| JP | H08-070452 | A | 3/1996 |
| JP | H08-070453 | A | 3/1996 |
| JP | H08-097725 | A | 4/1996 |
| JP | H08-101852 | A | 4/1996 |
| JP | H08-116260 | A | 5/1996 |
| JP | H08-116261 | A | 5/1996 |
| JP | H08-147163 | A | 6/1996 |
| JP | H08-172624 | A | 7/1996 |
| JP | H08-228343 | A | 9/1996 |
| JP | H08-228344 | A | 9/1996 |
| JP | H08-228345 | A | 9/1996 |
| JP | H08-228346 | A | 9/1996 |
| JP | H08-228347 | A | 9/1996 |
| JP | H08-228348 | A | 9/1996 |
| JP | H08-237654 | A | 9/1996 |
| JP | H08-241288 | A | 9/1996 |
| JP | H08-279763 | A | 10/1996 |
| JP | H08-316838 | A | 11/1996 |
| JP | H08-322044 | A | 12/1996 |
| JP | H08-322045 | A | 12/1996 |
| JP | H09-018871 | A | 1/1997 |
| JP | H09-091444 | A | 4/1997 |
| JP | 2638613 | B2 | 8/1997 |
| JP | H09-289642 | A | 11/1997 |
| JP | H09-307899 | A | 11/1997 |
| JP | H10-084514 | A | 3/1998 |
| JP | H10-093961 | A | 4/1998 |
| JP | 2759896 | B2 | 5/1998 |
| JP | H10-145780 | A | 5/1998 |
| JP | 2761449 | B2 | 6/1998 |
| JP | 2767847 | B2 | 6/1998 |
| JP | H10-177565 | A | 6/1998 |
| JP | H10-229562 | A | 8/1998 |
| JP | H10-248067 | A | 9/1998 |
| JP | H10-254696 | A | 9/1998 |
| JP | H10-261270 | A | 9/1998 |
| JP | 2810896 | B2 | 10/1998 |
| JP | H10-340127 | A | 12/1998 |
| JP | 2858602 | B2 | 2/1999 |
| JP | H11-074798 | A | 3/1999 |
| JP | H11-085969 | A | 3/1999 |
| JP | H11-088854 | A | 3/1999 |
| JP | H11-122116 | A | 4/1999 |
| JP | H11-149386 | A | 6/1999 |
| JP | H11-184718 | A | 7/1999 |
| JP | H11-215464 | A | 8/1999 |
| JP | H11-225334 | A | 8/1999 |
| JP | H11-238120 | A | 8/1999 |
| JP | H11-275582 | A | 10/1999 |
| JP | H11-275584 | A | 10/1999 |
| JP | H11-298765 | A | 10/1999 |
| JP | H11-298896 | A | 10/1999 |
| JP | H11-338735 | A | 12/1999 |
| JP | 2000-041262 | A | 2/2000 |
| JP | 2000-059234 | A | 2/2000 |
| JP | 2000-059769 | A | 2/2000 |
| JP | 2000-066894 | A | 3/2000 |
| JP | 2000-149445 | A | 5/2000 |
| JP | 2000-215057 | A | 8/2000 |
| JP | 2000-235644 | A | 8/2000 |
| JP | 2000-513523 | A | 10/2000 |
| JP | 2000-331150 | A | 11/2000 |
| JP | 2001-094437 | A | 4/2001 |
| JP | 2001-167057 | A | 6/2001 |
| JP | 2001-168728 | A | 6/2001 |
| JP | 2001-507555 | A | 6/2001 |
| JP | 2001-508631 | A | 6/2001 |
| JP | 2001-184500 | A | 7/2001 |
| JP | 2001-256048 | A | 9/2001 |
| JP | 2001-309386 | A | 11/2001 |
| JP | 2002-010277 | A | 1/2002 |
| JP | 2002-135778 | A | 5/2002 |
| JP | 3546437 | B2 | 7/2004 |
| JP | 3889069 | B2 | 3/2007 |
| JP | 2010-246130 | A | 10/2010 |
| JP | 4558409 | B2 | 10/2010 |
| WO | WO 1995/009390 | A1 | 4/1995 |
| WO | WO 1996/020567 | A1 | 7/1996 |
| WO | WO 1998/007278 | A2 | 2/1998 |
| WO | WO 1998/025232 | A1 | 6/1998 |
| WO | WO 1998/027720 | A1 | 6/1998 |
| WO | WO 1998/043243 | A1 | 10/1998 |
| WO | WO 1999/008204 | A1 | 2/1999 |
| WO | WO 1999/067883 | A2 | 12/1999 |
| WO | WO 2000/028430 | A1 | 5/2000 |
| WO | WO 2000/030040 | A1 | 5/2000 |
| WO | WO 2001/45426 | A1 | 6/2001 |
| WO | WO 2002/087248 | A2 | 10/2002 |

OTHER PUBLICATIONS

Final Initial Determination; *In the Matter of Certain Semiconductor Devices and Consumer Audiovisual Products Containing the Same*; ITC Inv. No. 337-TA-1047, see pp. 184-304; May 11, 2018; 455 pages.

Exhibit 1014 [Commission Opinion; ITC Inv. No. 337-TA-1047] to Petitioner's Reply to Patent Owner's Response, *VIZIO, Inc. et al.* v. *Broadcom Corporation*, PTAB Case No. IPR2018-00013; 36 pages.

U.S. Appl. No. 60/170,866, filed Dec. 14, 1999, MacInnis et al.

Amazon's P.R. 3-3 and 3-4 Disclosures and Invalidity Contentions, *Broadcom Corporation et al.* v. *Amazon.com, Inc. et al.*, C.D. Cal. Case No. 8:16-cv-01774-JVS-JCGx, see pp. 2, 10-11, 19, and Exhs. 9.1-9.5; May 1, 2017; 111 pages.

Civil Minutes—General: Proceedings: Order re Claim Construction, *Broadcom Corporation et al.* v. *Amazon.com, Inc. et al.*, C.D. Cal. Case No. 8:16-cv-01774-JVS-JCGx, ECF No. 118, see pp. 28-29; Sep. 1, 2017; 47 pages.

Joint Claim Construction Chart, *In the Matter of Certain Semiconductor Devices and Consumer Audiovisual Products Containing the Same*, ITC Investigation No. 337-TA-1047, see pp. 2 and 9; Aug. 11, 2017; 12 pages.

(56) References Cited

OTHER PUBLICATIONS

Joint List of Disputed Claim Terms and Proposed Constructions, *In the Matter of Certain Semiconductor Devices and Consumer Audiovisual Products Containing the Same*, ITC Investigation No. 337-TA-1047, see p. 2; Aug. 2, 2017; 13 pages.
Complainant Broadcom Corporation's List of Proposed Claim Constructions, *In the Matter of Certain Semiconductor Devices and Consumer Audiovisual Products Containing the Same*, ITC Investigation No. 337-TA-1047, see pp. 7-9; Jun. 23, 2017; 23 pages.
Respondents' Joint Proposed Constructions of Claim Terms Identified for Construction, *In the Matter of Certain Semiconductor Devices and Consumer Audiovisual Products Containing the Same*, ITC Investigation No. 337-TA-1047, see p. 2; Jun. 23, 2017; 11 pages.
Respondent Sigma Designs, Inc.'s Second Amended Proposed Constructions of Claim Terms Identified as Requiring Construction, *In the Matter of Certain Semiconductor Devices and Consumer Audiovisual Products Containing the Same*, ITC Investigation No. 337-TA-1047, see pp. 1-5; Jul. 24, 2017; 19 pages.
Complainant Broadcom Corporation's Petition for Commission Review—Public Version, *In the Matter of Certain Semiconductor Devices and Consumer Audiovisual Products Containing the Same*, ITC Investigation No. 337-TA-1047, see pp. 19-45; Jun. 8, 2018; 95 pages.
Complainant Broadcom Corporation's Reply to Respondents' Contingent Petition for Commission Review—Public Version, *In the Matter of Certain Semiconductor Devices and Consumer Audiovisual Products Containing the Same*, ITC Investigation No. 337-TA-1047, see pp. 18-27; Jun. 18, 2018; 71 pages.
Complainant Broadcom Corporation's Written Submission on the Issues Identified in the Notice of a Commission Determination to Review in Part a Final Initial Determination Finding No Violation of Section 337, *In the Matter of Certain Semiconductor Devices and Consumer Audiovisual Products Containing the Same*, ITC Investigation No. 337-TA-1047, see pp. 1-7, 14; Jul. 27, 2018; 51 pages.
Respondents' Joint Notice of Prior Art, *In the Matter of Certain Semiconductor Devices and Consumer Audiovisual Products Containing the Same*, ITC Investigation No. 337-TA-1047; Jul. 7, 2017; 60 pages.
Respondents' Contingent Petition to Review the Final Determination—Public Version, *In the Matter of Certain Semiconductor Devices and Consumer Audiovisual Products Containing the Same*, ITC Investigation No. 337-TA-1047, see pp. 21-36; May 29, 2018; 105 pages.
Response of Respondents Vizio, Inc. and Sigma Designs, Inc. to Complainant Broadcom Corporation's Petition for Commission Review—Public Version; *In the Matter of Certain Semiconductor Devices and Consumer Audiovisual Products Containing the Same*; ITC Investigation No. 337-TA-1047; see pp. 35-53; Jun. 6, 2018; 84 pages.
Respondents' Response to the Commission's Jul. 17, 2018 Notice and Request for Written Submissions—Public Version; *In the Matter of Certain Semiconductor Devices and Consumer Audiovisual Products Containing the Same*; ITC Investigation No. 337-TA-1047; see pp. 3-19, 26; Jul. 27, 2018; 48 pages.
Sigma Designs, Inc.'s Amended Notice of Prior Art; *In the Matter of Certain Semiconductor Devices and Consumer Audiovisual Products Containing the Same*; ITC Investigation No. 337-TA-1047; Jul. 31, 2017; 51 pages.
Petition for *Inter Partes Review* Under 37 C.F.R. § 42.100, *Amazon.com, Inc. et al.* v. *Broadcom Corporation*, PTAB Case No. IPR2017-01111, Mar. 17, 2017; 108 pages.
Exhibit 1003 [Declaration of Dr. Brian Stuart] to Petition for *Inter Partes Review* Under 37 C.F.R. § 42.100, *Amazon.com, Inc. et al.* v. *Broadcom Corporation*, PTAB Case No. IPR2017-01111; 118 pages.
Exhibit 1007 [Excerpt of Microsoft Press Computer Dictionary (5th ed. 2002)] to Petition for *Inter Partes Review* Under 37 C.F.R. § 42.100, *Amazon.com, Inc. et al.* v. *Broadcom Corporation*, PTAB Case No. IPR2017-01111; 3 pages.
Patent Owner's Preliminary Response, *Amazon.com, Inc. et al.* v. *Broadcom Corporation*, PTAB Case No. IPR2017-01111, Jul. 6, 2017; 60 pages.
Exhibit 2001 [IEEE Standard Glossary of Computer Hardware Terminology, IEEE Std 610.10-1994] to Patent Owner's Preliminary Response, *Amazon.com, Inc. et al.* v. *Broadcom Corporation*, PTAB Case No. IPR2017-01111; 3 pages.
Exhibit 2002 [ITU-T Telecommunication Standardization Sector of ITU, Series H: Audiovisual and Multimedia Systems Infrastructure of audiovisional services—Coding of moving video, H.262, Feb. 2000] to Patent Owner's Preliminary Response, *Amazon.com, Inc. et al.* v. *Broadcom Corporation*, PTAB Case No. IPR2017-01111; 5 pages.
Decision: Institution of *Inter Partes* Review 37 C.F.R. § 42.108, *Amazon.com, Inc. et al.* v. *Broadcom Corporation*, PTAB Case No. IPR2017-01111, Sep. 6, 2017; 31 pages.
Petition for *Inter Partes* Review, *LG Electronics, Inc.* v. *Broadcom Corporation*, PTAB Case No. IPR2017-01624, Jun. 16, 2017; 73 pages.
Exhibit 1006 [Kim et al., "A deblocking filter with two separate modes in block-based video coding," in *IEEE Transactions on Circuits and Systems for Video Technology*, vol. 9, No. 1, pp. 156-160, Feb. 1999] to Petition for Inter Partes Review, *LG Electronics, Inc.* v. *Broadcom Corporation*, PTAB Case No. IPR2017-01624; 5 pages.
Exhibit 1007 [Excerpts from IEEE Explore® Digital Library] to Petition for Inter Partes Review, *LG Electronics, Inc.* v. *Broadcom Corporation*, PTAB Case No. IPR2017-01624; 6 pages.
Exhibit 1008 [Myler Declaration] to Petition for Inter Partes Review, *LG Electronics, Inc.* v. *Broadcom Corporation*, PTAB Case No. IPR2017-01624; 78 pages.
Exhibit 1010 [Boger Declaration] to Petition for Inter Partes Review, *LG Electronics, Inc.* v. *Broadcom Corporation*, PTAB Case No. IPR2017-01624; 3 pages.
Patent Owner's Preliminary Response, *LG Electronics, Inc.* v. *Broadcom Corporation*, PTAB Case No. IPR2017-01624, Oct. 30, 2017; 15 pages.
Decision: Denying Institution of *Inter Partes* Review 37 C.F.R. § 42.108, *LG Electronics, Inc.* v. *Broadcom Corporation*, PTAB Case No. IPR2017-01624, Dec. 19, 2017; 14 pages.
Petition for *Inter Partes* Review, *VIZIO, Inc et al.* v. *Broadcom Corporation*, PTAB Case No. IPR2018-00013, Oct. 3, 2017; 110 pages.
Exhibit 1003 [Declaration of Dr. Brian Stuart] to Petition for *Inter Partes* Review, *VIZIO, Inc. et al.* v. *Broadcom Corporation*, PTAB Case No. IPR2018-00013; 120 pages.
Exhibit 1007 [Excerpt of Microsoft Press Computer Dictionary (5th ed. 2002)] to Petition for *Inter Partes Review* Under 37 C.F.R. § 42.100, *VIZIO, Inc. et al.* v. *Broadcom Corporation*, PTAB Case No. IPR2018-00013; 3 pages.
Patent Owner's Preliminary Response, *VIZIO, Inc. et al.* v. *Broadcom Corporation*, PTAB Case No. IPR2018-00013, Jan. 12, 2018; 27 pages.
Decision: Institution of *Inter Partes* Review 37 C.F.R. § 42.108, *VIZIO, Inc. et al.* v. *Broadcom Corporation*, PTAB Case No. IPR2018-00013, Apr. 6, 2018; 30 pages.
Patent Owner's Response, *VIZIO, Inc. et al.* v. *Broadcom Corporation*, PTAB Case No. IPR2018-00013, Jul. 12, 2018; 64 pages.
Exhibit 2003 [Declaration of Scott T. Acton, Ph.D] to Patent Owner's Response, *VIZIO, Inc. et al.* v. *Broadcom Corporation*, PTAB Case No. IPR2018-00013; 71 pages.
Exhibit 2005 [Excerpt of McGraw-Hill Dictionary of Electrical & Computer Engineering] to Patent Owner's Response, *VIZIO, Inc. et al.* v. *Broadcom Corporation*, PTAB Case No. IPR2018-00013; 3 pages.
Exhibit 2006 [Excerpt of Microsoft Press Computer Dictionary (5th ed. 2002)] to Patent Owner's Response, *VIZIO, Inc. et al.* v. *Broadcom Corporation*, PTAB Case No. IPR2018-00013; 3 pages.
Exhibit 2007 [Transcript of the Testimony of Brian Stuart; Jun. 26, 2018] to Patent Owner's Response, *VIZIO, Inc. et al.* v. *Broadcom Corporation*, PTAB Case No. IPR2018-00013; 101 pages.

(56) References Cited

OTHER PUBLICATIONS

Petitioner's Reply to Patent Owner's Response, *VIZIO, Inc. et al.* v. *Broadcom Corporation*, PTAB Case No. IPR2018-00013, Oct. 12, 2018; 38 pages.
Exhibit 1009 [Declaration of Brian Stuart, Ph.D in Support of Vizio's Reply to Broadcom's Patent Owner Response] to Petitioner's Reply to Patent Owner's Response, *VIZIO, Inc. et al.* v. *Broadcom Corporation*, PTAB Case No. IPR2018-00013; 55 pages.
Exhibit 1010 [Transcript of Videotaped Deposition of Scott T. Acton, Ph.D.; Sep. 13, 2018] to Petitioner's Reply to Patent Owner's Response, *VIZIO, Inc. et al.* v. *Broadcom Corporation*, PTAB Case No. IPR2018-00013; 48 pages.
Exhibit 1012 [Declaration of Scott T. Acton in Support of Complainant Broadcom Corporation's Initial Claim Construction Brief, ITC Inv. No. 337-TA-1047] to Petitioner's Reply to Patent Owner's Response, *VIZIO, Inc. et al.* v. *Broadcom Corporation*, PTAB Case No. IPR2018-00013; 16 pages.
Exhibit 1015 [International Standard ISO/IEC 13818-2, Second Edition, Dec. 15, 2000] to Petitioner's Reply to Patent Owner's Response, *VIZIO, Inc. et al.* v. *Broadcom Corporation*, PTAB Case No. IPR2018-00013; 221 pages.
Exhibit 1016 [A. Bovik; Handbook of Image & Video Processing, Second Edition] to Petitioner's Reply to Patent Owner's Response, *VIZIO, Inc. et al.* v. *Broadcom Corporation*, PTAB Case No. IPR2018-00013; 22 pages.
Exhibit 1017 [IEEE Std 610.10-1994; IEEE Standard Glossary of Computer Hardware Terminology] to Petitioner's Reply to Patent Owner's Response, *VIZIO, Inc. et al.* v. *Broadcom Corporation*, PTAB Case No. IPR2018-00013; 4 pages.
Exhibit 1018 [Excerpt, Wiley Electrical and Electronics Engineering Dictionary (2004)] to Petitioner's Reply to Patent Owner's Response, *VIZIO, Inc. et al.* v. *Broadcom Corporation*, PTAB Case No. IPR2018-00013; 3 pages.
Exhibit 1019 [International Standard ISO/IEC 13818-1; Information technology—Generic coding of moving pictures and associated audio information: Systems] to Petitioner's Reply to Patent Owner's Response, *VIZIO, Inc. et al.* v. *Broadcom Corporation*, PTAB Case No. IPR2018-00013; 174 pages.
Exhibit 1020 [Excerpt of Microsoft Press Computer Dictionary (5th ed. 2002)] to Petitioner's Reply to Patent Owner's Response, *VIZIO, Inc. et al.* v. *Broadcom Corporation*, PTAB Case No. IPR2018-00013; 5 pages.
Exhibit 1021 [Excerpt of The Illustrated Dictionary of Electronics; Audio/Video; Consumer Electronics; Wireless Technology] to Petitioner's Reply to Patent Owner's Response, *VIZIO, Inc. et al.* v. *Broadcom Corporation*, PTAB Case No. IPR2018-00013; 5 pages.
Exhibit 1022 [Excerpt of The Computer Glossary, The Complete Illustrated Dictionary, 9th ed.] to Petitioner's Reply to Patent Owner's Response, *VIZIO, Inc. et al.* v. *Broadcom Corporation*, PTAB Case No. IPR2018-00013; 5 pages.
Exhibit 1023 [Declaration of Brock F. Wilson] to Petitioner's Reply to Patent Owner's Response, *VIZIO, Inc. et al.* v. *Broadcom Corporation*, PTAB Case No. IPR2018-00013; 5 pages.
Petition for *Inter Partes* Review, *LG Electronics, Inc.* v. *Broadcom Corporation*, PTAB Case No. IPR2018-00477, Jan. 15, 2018; 105 pages.
Exhibit 1003 [Declaration of Dr. Brian L. Stuart in Support of Petition for *Inter Partes* Review of U.S. Pat. No. 8,284,844] to Petition for *Inter Partes* Review, *LG Electronics, Inc.* v. *Broadcom Corporation*, PTAB Case No. IPR2018-00477; 115 pages.
Exhibit 1007 [Excerpt of Microsoft Press Computer Dictionary (5th ed. 2002)] to Petition for *Inter Partes* Review, *LG Electronics, Inc.* v. *Broadcom Corporation*, PTAB Case No. IPR2018-00477; 3 pages.
Petitioner's Motion for Joinder and Request for Shortened Response Time for Patent Owner's Preliminary Response, *LG Electronics, Inc.* v. *Broadcom Corporation*, PTAB Case No. IPR2018-00477, Jan. 15, 2018; 9 pages.
Patent Owner's Opposition to Petitioner's Motion for Joinder, *LG Electronics, Inc.* v. *Broadcom Corporation*, PTAB Case No. IPR2018-00477, Feb. 15, 2018; 13 pages.
Lee et al., "Data Flow Processor for Multi-Standard Video Codec," Custom Integrated Circuits Conference, 1994, Proceedings of the IEEE 1994 San Diego, CA USA, May 1-4, 1994, New York, NY, USA, IEEE pp. 103-106; May 1, 1994.
Bose et al., "A Single Chip Multistandard Video Codec," IEEE Custom Integrated Circuits Conference, 1993; 4 pages.
Bailey et al., "Programmable Vision Processor/Controller for Flexible Implementation of Current and Future Image Compression Standards," IEEE, Oct. 1, 1992; 7 pages.
Herrmann et al., "Design of a Development System for Multimedia Applications Based on a Single Chip Multiprocessor Array," ICECS, Oct. 1996; 4 pages.
European Search Report, Application No. EP03007419; European Patent Office; dated Jun. 22, 2005; 1 page.
Kim et al., "A Deblocking Filter with Two Separate Modes in Block-Based Video Coding," IEEE Transactions on Circuits and Systems for Video Technology, vol. 9, No. 1, Feb. 1999; 5 pages.
Gadd et al., "A Hardware Accelerated MP3 Decoder with Bluetooth Streaming Capabilities," Master of Science Thesis, In cooperation with C Technologies AB; Nov. 2001; 60 pages.
Chien et al., "A Hardware Accelerator for Video Segmentation Using Programmable Morphology PE Array," IEEE, 2002; 4 pages.
Mo et al., "A High-Speed Pattern Decoder in MPEG-4 Padding Block Hardware Accelerator," IEEE, 2001; 4 pages.
Fandrianto et al., "A Programmable Solution for Standard Video Compression," IEEE, 1992; 4 pages.
Lee, "Accelerating Multimedia with Enhanced Microprocessors," IEEE Micro, Apr. 1995; 11 pages.
Heineken et al., "Acquiring Distance Knowledge in Virtual Environments," RTO MP-058, Apr. 2000; 7 pages.
Gaunet et al., "Active, passive and snapshot exploration in a virtual environment: influence on scene memory, reorientation and path memory," Cognitive Brain Research 11, Elsevier Science B.V., 2001; 12 pages.
Childers et al., "ActiveSpaces on the Grid: The Construction of Advanced Visualization and Interaction Environments," Springer-Verlag Berlin Heidelberg, 2000; 22 pages.
Yoon et al., "An 80/20-MHz 160-mW Multimedia Processor Integrated with Embedded DRAM, MPEG-4 Accelerator, and 3-D Rendering Engine for Mobile Applications," IEEE Journal of Solid-State Circuits, vol. 36, No. 11, Nov. 2001; 10 pages.
Tung et al., "An Efficient Streaming and Decoding Architecture for Stored FGS Video," IEEE Transactions on Circuits and Systems for Video Technology, vol. 12, No. 8, Aug. 2002; 6 pages.
Gura et al., "An End-to-End Systems Approach to Elliptic Curve Cryptography," Sun Microsystems Laboratories, Springer, 2003; 16 pages.
Ballagh, "An FPGA-based Run-time Reconfigurable 2-D Discrete Wavelet Transform Core," Thesis submitted to the Faculty of the Virginia Polytechnic Institute and State University, Jun. 2001; Copyright 2001, Jonathan B. Ballagh; 93 pages.
Abel et al., "Applications Tuning for Streaming SIMD Extensions," Intel Technology Journal Q2, 1999; 13 pages.
Berekovic, "Architecture of a Coprocessor Module for Image Compositing," IEEE, 1998; 4 pages.
BCM7020 Product Brief: High-Definition Video UMA Subsystem with 2D Graphics; Broadcom Corporation, 2000; 2 pages.
BCM7021RB Product Brief: High-Definition Video PCI Subsystem with 2D Graphics; Broadcom Corporation, 2001; 2 pages.
BCM7035R Product Brief: HD Video/Graphics UMA Subsystem and Mixer with DVI; Broadcom Corporation, 2002; 2 pages.
Ha et al., "Building a Virtual Framework for Networked Reconfigurable Hardware and Software Objects," IMEC, Jul. 15, 2001; 16 pages.
"C-Cube Microsystems Product Catalog" C-Cube Microsystems, Spring 1994; 100 pages.
Bove et al., "Cheops: A Reconfigurable Data-Flow System for Video Processing," IEEE Transactions on Circuits and Systems for Video Technology, vol. 5, No. 2, Apr. 1995; 10 pages.

(56) References Cited

OTHER PUBLICATIONS

Flerackers et al., "Creating Broadcast Interactive Drama in an NVE," IEEE, Jan./Feb. 2001; 5 pages.
"Data Book, PNX1300 Series Media Processors," Philips Semiconductors, Feb. 15, 2002; 548 pages.
Slingerland et al., "Design and Characterization of the Berkeley Multimedia Workload," Report No. UCB/CSD-00-1122, Computer Science Division (EECS), University of California Berkeley, Dec. 2000; 46 pages.
"Desktop Performance and Optimization for Intel® Pentium® 4 Processor," Intel Corporation, Feb. 2001; 26 pages.
Haskel et al., "Digital Video: An Introduction to MPEG-2," International Thomson Publishing, Copyright 1997 by Chapman & Hall; see pp. 1-54, 110-145, 183-279, 307-321,361-412; 268 pages.
Poynton, "Digital Video and HDTV Algorithms and Interfaces," Morgan Kaufmann Publishers, an Imprint of Elsevier Science, see pp. 474-592; Copyright 2003 by Elsevier Science (USA); 123 pages.
Schafer et al., "Digital Video Coding Standards and Their Role in Video Communications," Proceedings of the IEEE, vol. 83, No. 6, Jun. 1995; 18 pages.
Tekalp, "Digital Video Processing," Prentice Hall PTR, 1995; 30 pages.
Ripley, "DVI—A Digital Multimedia Technology," Journal of Computing in Higher Education, vol. I (2), Winter 1990; 30 pages.
Deprettere et al., "Embedded Processor Design Challenges: Systems, Architectures, Modeling, and Simulation—SAMOS," Springer-Verlag Berlin Heidelberg, 2002; 334 pages.
Cote et al., "H.263+: Video Coding at Low Bit Rates," IEEE Transactions on Circuits and Systems for Video Technology, vol. 8, No. 7, Nov. 1998; 18 pages.
Bhaskaran et al., "Image and Video Compression Standards: Algorithms and Architectures, Second Edition," see pp. 179-319, 329-358; Kluwer Academic Publishers, 1997; 174 pages.
Radhakrishnan et al., "Improving Java Performance Using Hardware Translation," ACM, 2001; 13 pages.
Regehr, "Inferring Scheduling Behavior with Hourglass," Proceedings of the FREENIX Track: 2002 Usenix; Usenix, 2002; 24 pages.
"Intel740™ Graphics Accelerator Datasheet," Intel Corporation, Apr. 1998; 94 pages.
Leven et al., "Interactive Visualization of Unstructured Grids Using Hierarchical 3D Textures," The Johns Hopkins University; IEEE, 2002; 8 pages.
Corcoran et al., "Inuit3D: An Interactive Virtual 3D Web Exhibition," National Research Council Canada, Institute for Information Technology; Apr. 2002; 12 pages.
Kozyrakis, "Lecture 15: Multimedia Instruction Sets: SIMD and Vector," University of California Berkeley, Mar. 14, 2001; 10 pages.
Kamemaru et al., "Media processor core architecture for realtime, bi-directional MPEG4/H.26X Codec with 30 fr/s for CIF-video," Custom Integrated Circuits Conference, IEEE, 2000; 4 pages.
Mitchell (ed.), "MPEG Video Compression Standard," International Thomson Publishing, Copyright 1997 by Chapman & Hall; see pp. 91-236, 357-382; 189 pages.
Yasuda et al., "MPEG2 Video Decoder and AC-3 Audio Decoder LSIs for DVD Player," IEEE Transactions on Consumer Electronics, vol. 43, No. 3, Aug. 1997; 7 pages.
Puri et al., "MPEG-4: An Object-based multimedia coding standard supporting mobile applications," Baltzer Science Publishers BV, 1998; 28 pages.
MSP-1EX System Specification (Appendix A) and MPC Bitstream Processor (Appendix B); 334 pages.
Brett, "Multi-standard MAC Decoder," Electronics & Wireless World, see pp. 510-511; May 1989; 5 pages.
Van Lammeren, "Multi-Standard Video Front End," IEEE Transactions on Consumer Electronics, vol. 37, No. 3, Aug. 1991; 7 pages.
Schwendt et al., "New Approach to Develop a System Solution for an Integrated Multi-Service System," IEEE Transactions on Consumer Electronics, vol. 45, No. 3, Aug. 1999; 8 pages.
Kwon et al., "Reconfigurable and Programmable Minimum Distance Search Engine for Portable Video Compression Systems," IEEE, 2001; 4 pages.
Pretty et al., "Reconfigurable DSP's for Efficient MPEG-4 Video and Audio Decoding," Proceedings of the First IEEE International Workshop on Electronic Design, Test and Applications; IEEE, 2002; 5 pages.
Panchanathan, "Reconfigurable Embedded Media Processors," IEEE, 2001; 6 pages.
Lange et al., "Reconfigurable Multiply-Accumulate-based Processing Element," University of Dortmund, Germany and Nokia Research Center, Bochum, Germany; 2002; 4 pages.
Mraz, "IBM Research Report—Secure Blue: An Architecture for a Scalable, Reliable High Volume SS1 Internet Server," IBM Research Division, Jun. 29, 2001; 18 pages.
Rabaey et al., "Tutorial HotChips 01: Silicon Architectures for Wireless Systems—Part 2 Configurable Processors," Berkeley Wireless Research Center; 66 pages.
Basoglu et al., "Single-Chip Processor for Media Applications: the MAP1000™," Int. J. Imaging Syst. Technol., vol. 10, pp. 96-106; John Wiley & Sons, Inc., 1999; 11 pages.
"SiS530 Host, PCI, 3D Graphics & Memory Controller: Pentium PCI / AGP 3D VGA Chipset," Silicon Integrated Systems Corp., SiS530 Preliminary Rev. 1.0; Nov. 10, 1998; 257 pages.
Nadehara et al., "Software MPEG-2 Video Decoder on a 200-MHz, Low-Power Multimedia Microprocessor," IEEE, 1998; 4 pages.
Hartenstein, "The Microprocessor is no more General Purpose: why Future Reconfigurable Platforms will win," ResearchGate, invited paper, Proceedings of the International Conference on Innovative Systems, Austin, TX, USA, Oct. 8-10, 1997; 13 pages.
Petitjean et al., "Towards Real-Time Video Watermarking for System-on-Chip," IEEE, 2002; 4 pages.
"TriMedia TM1300 Preliminary Data Book," Philips Electronics North America Corporation, Oct. 1999; 530 pages.
"Using Streaming SIMD Extensions 2 (SSE2) to Implement an Inverse Discrete Cosine Transform," Version 2.0; Intel Corporation, Sep. 21, 2000; 44 pages.
Suzuki et al., "V830R/AV: Embedded Multimedia Superscalar RISC Processor," IEEE Micro, pp. 36-47; Mar./Apr. 1998; 12 pages.
Jack, "Video Demystified: A Handbook for the Digital Engineer," Second Edition, pp. 426-690; HighText Interactive, Inc., 1996; 269 pages.
Pirsch et al., "VLSI Architectures for Video Compression—A Survey," IEEE, Feb. 1995; 27 pages.
Brinthaup et al., "WP 2.5: A Video Decoder for H.261 Video Teleconferencing and MPEG Stored Interactive Video Applications," IEEE International Solid-State Circuits Conference, 1993; 2 pages.
ZR36710 Product Brief: Vaddis III™ Integrated DVD Decoder; ZORAN Corporation, Nov. 1998; 2 pages.
ZR36730 Product Brief: Vaddis IV™ Integrated DVD Decoder; ZORAN Corporation, Aug. 1999; 2 pages.
Galbi etaL, "An MPEG-1 Audio/Video Decoder with Run-Length Compressed Antialiased Video Overlays," IEEE International Solid-State Circuits Conference, Feb. 15, 1995; 3 pages.
Howard et al., "Virtual Environments for Scene of Crime Reconstruction and Analysis," PROC SPIE INT SOC OPT ENG. vol. 3960, 2000; 8 pages.
Brett, "Video Processing for Single-Chip DVB Decoder," IEEE, 2001; 9 pages.
Owen et al., "An enhanced DSP architecture for the seven multimedia functions: the Mpact 2 media processor," 1997 IEEE Workshop on Signal Processing Systems; SiPS 97 Design and Implementation, formerly VLSI Signal Processing; IEEE, Nov. 5, 1997; 10 pages.
Purcell, "Mpact 2 media processor, balanced 2X Performance," Proceedings IS&T/SPIE Symposium on Electronic Imaging; vol. 3021, pp. 102-108; Feb. 1997; 7 pages.
Kessler et al., "The Alpha 21264 Microprocessor Architecture," Proceedings of the International Conference on Computer Design: VLSI in Computers and Processors, 1998; 6 pages.

(56) References Cited

OTHER PUBLICATIONS

Leibholz et al., "The Alpha 21264: A 500 MHz Out-of-Order Execution Microprocessor," Proceedings of Compcon '97; IEEE 1997, see pp. 28-36; 9 pages.
Foley, "The Mpact™ Media Processor Redefines the Multimedia PC," 1996 IEEE; Proceedings of COMPCON '96; 8 pages.
Hansen, "MicroUnity's MediaProcessor Architecture," IEEE Micro, Aug. 1996; 8 pages.
Philips Trimedia Software Development Environment Cookbook; Philips Semiconductors, 1998; 350 pages.
Philips Programmable Media Processor, Trimedia TM-1100; Philips Semiconductors, 1998; 9 pages.
Trimedia TM1000 Preliminary Data Book; Philips Electronics North America Corporation, 1997; 496 pages.
Trimedia TM1100 Data Book; Philips Electronics North America Corporation, Jul. 1999 Third Draft; 518 pages.
Yao, "Chromatic's Mpact 2 Boosts 3D: Mpact/3000 Becomes First Media Processor to Ship in Volume," Microdesign Resources; Microprocessor Report vol. 10, No. 15; Nov. 18, 1996; 6 pages.
Chromatic Mpact; Chromatic Research; 9 pages.
Purcell, "The Impact of Mpact 2: The Mpact 2 VLIW Media Processor Improves Multimedia Performance in PCs;" Chromatic Research; IEEE Signal Processing Magazine, Mar. 1998, IEEE; 6 pages.
Commission Decision, *In the Matter of Certain Semiconductor Devices and Consumer Audiovisual Products Containing the Same*, ITC Investigation No. 337-TA-1047; Sep. 11, 2019; 36 pages.
Respondents' Joint Notice of Prior Art; *In the Matter of Certain Infotainment Systems, Components Thereof, and Automobiles Containing the Same*; ITC Inv. No. 337-TA-1119; Jan. 4, 2019; 628 pages.
Complainant Broadcom Corporation's Initial Markman Brief, *In the Matter of Certain Infotainment Systems, Components Thereof, and Automobiles Containing the Same*, ITC Investigation No. 337-TA-1119; Jan. 11, 2019; 60 pages.
Respondents'Opening Markman Brief, *In the Matter of Certain Infotainment Systems, Components Thereof, and Automobiles Containing the Same*, ITC Investigation No. 337-TA-1119; Jan. 11, 2019; 59 pages.
Complainant Broadcom Corporation's Rebuttal Markman Brief, *In the Matter of Certain Infotainment Systems, Components Thereof, and Automobiles Containing the Same*, ITC Investigation No. 337-TA-1119; Jan. 25, 2019; 37 pages.
C-Cube Microsystems, Full text of "c-cube :: 90-0500-001 C-Cube Product Catalog Spring 1994," available at: *https://archive.org/stream/bitsavers_ccube90050alogSpring1994_8607743/90-0500-001_C-Cube_Product_Catalog_Spring_1994_djvu.txt*; Spring 1994; 147 pages.
C-Cube Microsystems, Full text of "c-cube :: 90-1450-101 CL450 MPEG Video Decoder Users Manual 1994," avallable at: *http://archive.org/...e90145ecoderUsersManual1994_10396747/90-1450-101_CL450_MPEG_Video_Decoder_Users_Man ual_1994_djvu.txt*, 1994; 601 pages.
Purcell, "Mpact 2 media processor: balanced 2X performance," Proceedings of SPIE 3021, Multimedia Hardware Architectures 1997, Jan. 17, 1997; 8 pages.
Mpact Media Processor Preliminary Data Sheet, Chromatic Research, Sep. 11, 1996; 22 pages.
Data Book TM-1300 Data Book Media Processor, Product Specification, Philips Semiconductors; Sep. 30, 2000; 532 pages.
Petrescu, "Efficient Implementation of video post-processing algorithms on the bops parallel architecture," 2001 IEEE ICASP, May 2001; 4 pages.
Takahashi, et al., "A 60-MHz 240-mW MPEG-4 Videophone LSI with 16-Mb Embedded DRAM," IEEE Journal of Solid-State Circuits, vol. 35, No. 11, Nov. 2000; 9 pages.
Takahashi, et al., "A 60-mW MPEG4 Video Codec Using Clustered Voltage Scaling with Variable Supply-Voltage Scheme," IEEE Journal of Solid-State Circuits, vol. 33, No. 11, Nov. 1998; 9 pages.
EM8470, EM8471, EM8475, EM8476 Data Sheet, MPEG-4 Decoder for Set-top, DVD and Streaming Applications, Sigma Designs; Mar. 18, 2002; 12 pages.
EM8550/EM8551 Datasheet, Single chip digital media processor for SDTV consumer appliances, Sigma Designs; Mar. 12, 2004; 77 pages.
Singh et al., "MorphoSys: An Integrated Re-configurable Architecture," Proceeding of the NATO Symposium on Concepts and Integration, 1998; 11 pages.
Slingerland et al., "Design and characterization of the Berkeley multimedia workload," Multimedia Systems, 2002; 13 pages.
Soderquist et al., "Optimizing the Data Cache Performance of a Software MPEG-2 Video Decoder," ACM Multimedia '97, Seattle, Washington; Nov. 1997; 11 pages.
van der Tol et al., "Mapping of MPEG-4 decoding on a flexible architecture platform," Proc. SPIE 4674, Media Processors 2002; Dec. 20, 2001; 13 pages.
ITU-T Telecommunication Standardization Sector of ITU, Series H: Audiovisual and Multimedia Systems Infrastructure of audiovisional services—Coding of moving video, Information technology—Generic coding of moving pictures and associated audio information: Video, Amendment 1: Video elementary stream content description data, H.262 Amendment 1, Nov. 2000; 26 pages.
ITU-T Telecommunication Standardization Sector of ITU, Series H: Audiovisual and Multimedia Systems Infrastructure of audiovisional services—Coding of moving video, Information technology—Generic coding of moving pictures and associated audio information: Video, Technical Corrigendum 1, H.262 Corrigendum 1, Nov. 2000; 10 pages.
Rixner et al., "Memory Access Scheduling," ISCA '27 Proceedings, Computer Architecture News, vol. 28, No. 2, May 2000; 11 pages.
Aono et al., "A Video Digital Signal Processor with a Vector-Pipeline Architecture," IEEE Jounal of Solid-State Circuits, vol. 27, No. 12, Dec. 1992; 9 pages.
Wu et al., "A Function-Pipelined Architecture and VLSI Chip for MPEG Video Image Coding," IEEE Transactions on Consumer Electronics, vol. 41, No. 4, Nov. 1995; 11 pages.
Brinthaupt et al., "FP 15.2: A Programmable Audio/Video Processor for H.320, H.324, and MPEG," 1996 IEEE International Solid State Circuits Conference, Session 15, Multimedia Signal Processing, Paper FP 15.2; Feb. 9, 1996; 2 pages.
Ohtani et al., "A Motion Estimation Processor for MPEG2 Video Real Time Encoding at Wide Search Range," IEEE 1995 Custom Integrated Circuits Conference; 1995 IEEE; 4 pages.
Lin et al., "On the Bus Arbitration for MPEG 2 Video Decoder", 1995 International Symposium on VLSI Technology, Systems, and Applications; Proceedings of Technical Papers, 1995; 5 pages.
Ishihara et al., "FA 17.2: A Half-pel Precision MPEG2 Motion-Estimation Processor with Concurrent Three-Vector Search," 1995 IEEE International Solid State Circuits Conference, Session 17, Video Signal Processing, Paper FA 17.2; 1995; 3 pages.
Liu, "MPEG Decoder Architecture for Embedded Applications," IEEE Transactions on Consumer Electronics, vol. 42, No. 4; Nov. 1996; 8 pages.
Senda et al., "Theoretical Background and Improvement of a Simplified Half-Pel Motion Estimation," IEEE; 1996; 4 pages.
Fujita et al., "Implementation of Half-Pel Precision Motion Estimator for MPEG2 MP@HL," 1996 IEEE TENCON—Digital Processing Applications; 1996; 6 pages.
Katayama et al., "A block processing unit in a single-chip MPEG-2 video encoder LSI," IEEE; 1997; 10 pages.
Chen et al., "A Fully Pipelined Parallel Cordic Architecture for Half-Pel Motion Estimation," Proceedings of International Conference on Image Processing, Oct. 1997; IEEE; 1997; 4 pages.
Miyagoshi et al., "TP 2.1: A 100mm$^2$ 0.95W Single-Chip MPEG2 MP@ML Video Encoder with a 128GOPS Motion Estimator and a Multi-Tasking RISC-Type Controller," 1998 IEEE International Solid-State Circuits Conference, Session 2, Video and Multimedia Signal Processing, Paper TP 2.1; Digest of Technical Papers; Feb. 5, 1998; 3 pages.
Ling et al., "An Efficient Controller Scheme for MPEG-2 Video Decoder," IEEE Transactions on Consumer Electronics, vol. 44, No. 2; May 1998; 8 pages.

(56) References Cited

OTHER PUBLICATIONS

Chen et al., "Extracting Coding Parameters from Pre-Coded MPEG-2 Video," IEEE; 1998; 5 pages.
Cantuneau et al., "Efficient Parallelisation of an MPEG-2 Codec on a TMS320C80 Video Processor," IEEE; 1998; 4 pages.
Chen et al., "A Single-chip MPEG-2 Video Encoder/Decoder for Consumer Applications," IEEE; 1999; 4 pages.
Kim et al., "Reconfigurable Low Energy Multiplier for Mutlimedia System Design," Proceedings IEEE Computer Society Workshop on VLSI 2000, System Design for a System-on-Chip Era; Apr. 2000; 6 pages.
Kim et al., "A Reconfigurable Pipelined IDCT for Low-Energy Video Processing," Proceedings of 13th Annual IEEE International ASIC/SOC Conference; IEEE; Sep. 2000; 5 pages.
Hashimoto et al., "9.1: A 90mW MPEG4 Video Codec LSI with the Capability for Core Profile," 2001 IEEE International Solid-State Circuits Conference, Session 9, Integrated Multimedia Processors, 9.1; IEEE; 2001; 3 pages.
Chen et al., "Efficient Architecture and Design of an Embedded Video Coding Engine," IEEE Transactions on Multimedia, vol. 3, No. 3; Sep. 2001; 13 pages.
Lee et al., "Efficient Motion Estimation Using Edge-Based Binary Block-Matching and Refinement Based on Motion Vector Correlation," IEEE; 2001; 4 pages.
Mohri et al., "A Real-Time Digital VCR Encode/Decode and MPEG-2 Decode LSI Implemented on a Dual-Issue RISC Processor," IEEE Journal of Solid-State Circuits, vol. 34, No. 7; Jul. 1999; 9 pages.
Matusiak, "Extended Precision Radix-4 Fast Fourier Transform Implemented on the TMS320C62x," Texas Instruments Application Report, SPRA297; Nov. 2002; 19 pages.
Dillon, Jr., "G.723.1 Dual-Rate Speech Coder: Multichannel TMS320C62x Implementation," Texas Instruments Application Report, SPRA552B; Feb. 2000; 18 pages.
Chen et al., "G.726 ADPCM Speech Coder: Multichannel TMS320C62x DSP Implementation," Texas Instruments Application Report, SPRA563C; Mar. 2001; 17 pages.
Chen et al., "G.729/A Speech Coder: Multichannel TMS320C62x Implementation," Texas Instruments Application Report, SPRA564B; Feb. 2000; 11 pages.
Wang et al., "GSM Enhanced Full Rate Speech Coder: Multichannel TMS320C62x Implementation," Texas Instruments Application Report, SPRA565B; Feb. 2000; 12 pages.
Wang et al., "IS-127 Enhanced Variable Rate Speech Coder: Multichannel TMS320C62x Implementation," Texas Instruments Application Report, SPRA566B; Feb. 2000; 15 pages.
Cheung, "MPEG-2 Video Decoder: TMS320C62x Implementation," Texas Instruments Application Report, SPRA649; Mar. 2000; 13 pages.
Min et al., "Optimizing JPEG on the TMS320C6211 2-Level Cache DSP," Texas Instruments Application Report, SPRA705; Dec. 2000; 32 pages.
Bell, "TMS320C621x/TMS320C671x EDMA Queue Management Guidelines," Texas Instruments Application Report, SPRA720; Feb. 2001; 13 pages.
Bowen et al., "TMS320C621x/TMS320C671x EDMA Architecture," Texas Instruments Application Report, SPRA996; Mar. 2004; 21 pages.
Ward et al., "TMS320C6000 EDMA IO Scheduling and Performance," Texas Instruments Application Report, SPRAA00; Mar. 2003; 23 pages.
Bowen et al., "TMS320C671x/TMS320C621x EDMA Performance Data," Texas Instruments Application Report, SPRAA03; Mar. 2004; 19 pages.
TMS320C6211 Fixed-Point Digital Signal Processor; Texas Instruments, SPRS073 Product Preview; Aug. 1998; 53 pages.
TMS320C6211 Fixed-Point Digital Signal Processor; Texas Instruments, SPRS073A Advance Information; Revised Mar. 1999; 58 pages.
TMS320C6211 Fixed-Point Digital Signal Processor; Texas Instruments, SPRS073B Advance Information; Revised Apr. 2000; 63 pages.
TMS320C621x/C671x DSP Two-Level Internal Memory Reference Guide; Texas Instruments Literature No. SPRU609; Aug. 2002; 55 pages.
TMS320C621x/C671x DSP Two-Level Internal Memory Reference Guide; Texas Instruments Literature No. SPRU609A; Nov. 2003; 56 pages.
TMS320C621x/C671x DSP Two-Level Internal Memory Reference Guide; Texas Instruments Literature No. SPRU609B; Jun. 2004; 66 pages.
TMS320C62x DSP CPU and Instruction Set Reference Guide; Texas Instruments Literature No. SPRU731; Jul. 2006; 287 pages.
TMS320C62x DSP CPU and Instruction Set Reference Guide; Texas Instruments Literature No. SPRU731A; May 2010; 288 pages.
TMS320AV7100 Integrated Set-Top Digital Signal Processor; Texas Instruments, SCSS022 Product Preview; Oct. 1997; 62 pages.
TMS320AV7100 Integrated Set-Top Digital Signal Processor; Texas Instruments, SCSS022A; Revised Mar. 1998; 68 pages.
Lawson et al., "Interfacing the TSB12LV41 1394 Link Layer Controller to the TMS320AV7100 DSP Embedded ARM Processor," Application Brief: SLLA015; Texas Instruments; Dec. 15, 1997; 32 pages.
TMS320C6000 Chip Support Library API Reference Guide; Texas Instruments Literature No. SPRU401; Mar. 2000; 236 pages.
Introducing the TMS320C6211-DSK handout; Texas Instruments; available at: http://www.ti.com/sc/docs/general/dsp/fest99/edu_trackam/dsp_fest_6211_3x_dsk_handout.pdf; 12 pages.
Bell, "Applications Using the TMS320C6000 Enhanced DMA," Texas Instruments, Application Report SPRA636A; Oct. 2001; 100 pages.
TMS320C6000 DSP Enhanced Direct Memory Access (EDMA) Controller Reference Guide; Texas Instruments Literature No. SPRU234B; Mar. 2005; 269 pages.
Lee et al., "MediaStation 5000: Integrating Video and Audio," IEEE; 1994; 22 pages.
Kim et al., "A Real Time MPEG Encoder Using a Programmable Processor," IEEE Transactions on Consumer Electronics, vol. 40, No. 2; May 1994; 10 pages.
Embedded graphics and imaging support; IEEE Micro; 1 page.
Tremblay et al., "VIS Speeds New Media Processing," IEEE Micro, Aug. 1996; 11 pages.
Watlington, "Video & Graphics Processors: 1997," MIT Media Laboratory; May 9, 1997; 14 pages.
Furht, "Processor Architectures for Multimedia: A Survey," Florida Atlantic University; 16 pages.
Tremeac et al., "An Example of Rapid Prototyping on the TMS320C80 Multimedia Video Processor(MVP)," IEEE; 1998; 4 pages.
Gove, "The Multimedia Video Processor (MVP): a Chip Architecture for Advanced DSP Applications," IEEE; 1994; 4 pages.
Basoglu et al., "A Real-Time Scan Conversion Algorithm on Commercially Available Microprocessors," Ultrasonic Imaging, vol. 18, No. 4; Oct. 1996; 21 pages.
TMCS320C80 Processor Description; 4 pages.
The MVP Performance Monitor, IEEE Concurrency; Jan.-Mar. 1997; 2 pages.
May, "Programming TI's Multimedia Video Processor," Dr. Dobb's Journal; Nov. 1995; 6 pages.
TMS320C80 search, Database: INSPEC Set04, 1995-2000 (2001 edn), Records 51-60; Information to Change the World; available at http://www.dialogatsite.com/atsiteext.dll; 5 pages.
TMS320C80 search, Database: INSPEC Set04, 1995-2000 (2001 edn), Records 61-70; Information to Change the World; available at http://www.dialogatsite.com/atsiteext.dll; 6 pages.
TMS320C8x System-Level Synopsis; Texas Instruments, SPRU113B; Sep. 1995; 30 pages.
Kim et al., "Networking Requirements and the Role of Multimedia Systems in Telemedicine," SPIE, vol. 2608; Oct. 1, 1995; 7 pages.

(56) References Cited

OTHER PUBLICATIONS

Kim et al., "UWICL: A Multi-Layered Parallel Image Computing Library for Single-Chip Multiprocessor-based Time-Critical Systems," Real-Time Imaging 2, Academic Press Limited; 1996; 14 pages.
Kim, "Real-Time Medical Imaging With Multimedia Technology," ITAB '97; 1997; 5 pages.
Kim et al., "Simulating Multimedia Systems with MVPSIM," IEEE Design & Test of Computers; Winter 1995; 11 pages.
Kim et al., "Performance Monitoring: Performance Analysis and Tuning for a Single-Chip Multiprocessor DSP," IEEE Concurrency; Jan.-Mar. 1997; 12 pages.
Hetherington et al., "Test Generation and Design for Test for a Large Multiprocessing DSP," International Test Conference; IEEE; 1995; 8 pages.
Owall et al., "A Custom Image Convolution DSP with a Sustained Calculation Capacity of >1GMAC/s and Low I/O Bandwidth," Journal of VLSI Signal Processing 23; Kluwer Academic Publishers; 1999; 15 pages.
TMS320C8x Overview; DSP Internal Web; Texas Instruments; available at: http://www-mkt.sc.ti.com/internal/docs/dsp/c8x/overview.html; Updated on Aug. 19, 1996; Downloaded on Mar. 13, 2003; 3 pages.
3.1: Overview of the TMS320C8x Memory Organization & 3.2: On-Chip Memory Organization; TMS320C8x System-Level Synopsis; 7 pages.
TMS320C80 Block Diagram slides; The Leader in DSP Solutions; Oct. 15, 1996; 3 pages.
TMS320C82: 'C8x Performance for $82 slides; 22 pages.
Gallagher et al., The TMS320C82 DSP: new power in the lineup, Tech Talk Online: New Products; available at: http://www-mkt.sc.ti.com/internal/docs/techtalk/4q95/c82.htm; Downloaded on May 14, 2003; 8 pages.
Grady, The TMS320C80 (MVP) programming environment, Tech Talk Online: Emerging Applications; available at: http://www-mkt.sc.ti.com/internal/docs/techtalk/2q95/c80.htm; Downloaded on May 14, 2003; 5 pages.
Kim et al., "Engineering Quality: Performance evaluation of assembly-level register allocator for the advanced DSP of TMS320C80," TI Technical Journal; May-Jun. 1997; 14 pages.
TMS320C80 (MVP) Parallel Processor User's Guide; Digital Signal Processing Products; SPRU110A, Texas Instruments; Mar. 1995; 54 pages.
TMS320 DSP Development Support Reference Guide; Literature No. SPRU011F, Texas Instruments; May 1998; 430 pages.
Furht, "Processor Architectures For Multimedia," Chapter 21; 22 pages.
Bonomini et al., "Implementing an MPEG2 Video Decoder Based on the TMS320C80 MVP," ESIEE, Paris; SPRA332, Texas Instruments; Sep. 1996, 23 pages.
TMS320C8x System-Level Synopsis; SPRU113B, Texas Instruments; Sep. 1995; 81 pages.
TMS320C80 (MVP) Master Processor User's Guide; Digital Signal Processing Products; SPRU109A, Texas Instruments; Mar. 1995; 595 pages.
Texas Instruments Intros Multimedia DSP; Newsbytes News Network; Mar. 10, 1994; 2 pages.
Image: MVP TMS320-DSP; The EVM from Loughborough Sound Images; 2 pages.
"World's first development system for new MVP;" Ref. EM1534, Loughborough Sound Images Ltd. Press Release; Mar. 10, 1994; 3 pages.
Gove, "The MVP: A Single-Chip Multiprocessor for Image & Video Applications;" Texas Instruments, Inc.; 4 pages.
MVP Press Coverage (containing numerous newspaper articles); 209 pages.
Guttag, "A single-chip multiprocessor for image compression and decompression—the MVP;" Texas Instruments Inc.; 12 pages.
MVP Advanced DSP (ADSP) slides; Texas Instruments; 13 pages.
Semiconductor Group Press Materials; Texas Instruments; 68 pages.
TMS320C80 Multimedia Video Processor (MVP) Technical Brief; SPRU106A, Texas Instruments; Jun. 1994; 95 pages.
Swenson, "Bacon's Multimedia users get boost from new computer cards" (containing several newspaper articles); 14 pages.
Strauss, "DSP Strategies: Embedded Chip Trend Continues: A Study of IC Markets Driven by Digital Signal Processing Technology;" Report No. 6010, Forward Concepts Electronic Market Research; Feb. 2006; 387 pages.
From Concept to Reality: The Merging of Design, Engineering and Manufacturing; Focus, Sony Technology Center—San Diego; Sony; 4th Quarter 1996; 24 pages.
MVP Backgrounder; Precision Digital Images (PPI) Corporation; 3 pages.
Selected Press Clippings; Precision Digital Images (PPI) Corporation; 10 pages.
MVP Pevelopment Kit: PC Application Development Kit for Texas Instruments MVP; Precision Pigital Images (PDI) Corporation; 2 pages.
Interesting-People Message; FYI: Hot Chips Symposim V: Advance Program; Sponsored by the IEEE Computer Society Technical Committee on Microprocessors; Jun. 1, 1993; 8 pages.
Hot Chips V: Symposium Record; Stanford University; Sponsored by the Technical Committee on Microprocessors and Microcomputers of the IEEE Computer Society; Aug. 8-10, 1993; 9 pages.
Causey, "Programming MVP is Simple, Says LSI," Technology News, Electronic Times; Mar. 24, 1994; 1 page.
Potential Winners; RGN, Electronic Engineering; Apr. 1994; 1 page.
MVP: The dawn of a new era in digital signal processing, Introducing TMS320C8x; Extending Your Reach With Total Integration Product Bulletin; Texas Instruments; 1994; 16 pages.
TMS320C80 Multimedia Video Processor Advance Information; SPRS023, Texas Instruments; Jul. 1994; 94 pages.
MVP Transfer Controller User's Guide; Texas Insruments; 2012; 311 pages.
TMS320C80 (MVP) Transfer Controller User's Guide; SPRU105A, Texas Instruments; Mar. 1995; 339 pages.
Acoustic Echo Cancellation Algorithms and Implementation on the TMS320C8x Application Report; SPRA063, Texas Instruments; May 1996; 92 pages.
Akhan et al., "Faster Scan Conversion Using the TMS320C80;" ESIEE, Paris; SPRA330, Texas Instruments; Sep. 1996; 20 pages.
Interfacing DRAM to the TMS320C80 Application Report; SPRA056, Texas Instruments; Jul. 1996; 51 pages.
Interfacing SDRAM to the TMS320C80 Application Report; SPRA055, Texas Instruments; Aug. 1996; 50 pages.
Modified Goertzel Algorithm in DTMF Detection Using the TMS320C80 Application Report; SPRA066, Texas Instruments; Jun. 1996; 19 pages.
Mooshofer et al., "Parallelization of a H.263 Encoder for the TMS320C80 MVP;" ESIEE, Paris; SPRA339, Texas Instruments; Sep. 1996; 29 pages.
TMS320C80 Frame Buffer Application Report; SPRA156, Texas Instruments; Feb. 1997; 90 pages.
TMS320C80 (MVP) C Source Debugger User's Guide; SPRU107A, Texas Instruments; Mar. 1995; 467 pages.
TMS320C80 (MVP) Code Generation Tools User's Guide; SPRU108A, Texas Instruments; Mar. 1995; 634 pages.
TMS320C80 (MVP) Multitasking Executive User's Guide; SPRU112A, Texas Instruments; Mar. 1995; 213 pages.
TMS320C80 (MVP) Parallel Processor User's Guide; SPRU110A, Texas Instruments; Mar. 1995; 705 pgs.
TMS320C80 (MVP) Transfer Controller User's Guide; SPRU105B, Texas Instruments; Mar. 1998; 400 pages.
TMS320C80 (MVP) Video Controller User's Guide; SPRU111A, Texas Instruments; Mar. 1995; 185 pages.
TMS320C80 Digital Signal Processor Data Sheet; SPRS023B, Texas Instruments; Oct. 1997; 171 pages.
TMS320C80 Multimedia Video Processor Advance Information; SPRS023, Texas Instruments; Jul. 1994; 93 pages.
TMS320C80 to TMS320C82 Software Compatibility User's Guide; SPRU154, Texas Instruments; Nov. 1995; 64 pages.

(56) References Cited

OTHER PUBLICATIONS

TMS320C82 Digital Signal Processor; SPRS048, Texas Instruments; Apr. 1998; 147 pages.
TMS320C82 Errata Sheet, Dec. 31, 1997—Version 1.0h; SPRZ125, Texas Instruments; Apr. 1998; 22 pages.
TMS320C82 Transfer Controller User's Guide; Literature No. SPRU261, Texas Instruments; Jun. 1998; 421 pages.
TMS320C8x (DSP) Fundamental Graphic Algorithms Application Book; SPRA069, Texas Instruments; Jun. 1996; 76 pages.
TMS320C8x PC Emulator Installation Guide; SPRU148A, Texas Instruments; May 1997; 43 pages.
TMS320C8x Register Allocator and Code Compactor User's Guide, Release 2.00; SPRU217, Texas Instruments; Feb. 1997; 42 pages.
TMS320C8x Software Development Board Installation Guide; SPRU150B, Texas Instruments; Jan. 1997; 54 pages.
TMS320C8x Software Development Board Programmer's Guide; SPRU178, Texas Instruments; Jan. 1997; 309 pages.
TMS320C8x System-Level Synopsis; SPRU113B, Texas Instruments; Sep. 1995; 75 pages.
"Information technology—Coding of audio-visual objects—Part 2: Visual"; International Organization for Standardization; ISO/IEC 14496-2:2001/Amd.1:2002(E); Second edition, Amendment 1; Feb. 1, 2002; 178 pages.
"Information technology—Coding of audio-visual objects—Part 2: Visual"; International Organization for Standardization; ISO/IEC 14496-2:2001/Amd.2:2002(E); Second edition, Amendment 2; Feb. 1, 2002; 62 pages.
"Information technology—Coding of audio-visual objects—Part 2: Visual"; International Organization for Standardization; ISO/IEC 14496-2:2001 (E); Second edition; Dec. 1, 2001; 536 pages.
"Information technology—Coding of audio-visual objects—Part 2: Visual"; International Organization for Standardization; ISO/IEC 14496-2:2001; available at https://www.iso.org/standard/36081.html; 2001; 3 pages.
Recommendation ITU-T H.262 (1995 E); ISO/IEC 13818-2: 1995 (E); 254 pages.
Ackland et al., "A Video-Codec Chip Set for Multimedia Applications," AT&T Technical Journal; Jan./Feb. 1993; 17 pages.
Arakawa et al., "Software architecture for flexible and extensible image decoding," Signal Processing: Image Communication 10; Elsevier Science B.V.; 1997; 14 pages.
Arrigo et al., "Adaptive FEC on a Reconfigurable Processor for Wireless Multimedia Communications," IEEE; 1998; 4 pages.
Chau et al., "A Single-Chip Real-Time MPEG2 Video Decoder," IEEE; 1994; 2 pages.
Lai et al., "A Novel Video Signal Processor With Reconfigurable Pipelined Architecture," IEEE; 1996; 4 pages.
Mayer, "The Architecture of a Processor Array for Video Decompression," IEEE Transactions on Consumer Electronics, vol. 39, No. 3; Aug. 1993; 5 pages.
Murayama et al., "Single-Chip BiCMOS Multistandard Video Processor," IEEE Transactions on Consumer Electronics, vol. 42, No. 3; Aug. 1996; 11 pages.
Page, "Reconfigurable processor architectures," Microprocessors and Microsystems 20; Elsevier Science B.V.; 1996; 12 pages.
Ronner et al., "Architecture and Applications of the HiPAR Video Signal Processor," IEEE Transactions on Circuits and Systems for Video Technology, vol. 6, No. 1; Feb. 1996; 11 pages.
Sikora, "Digital Video Coding Standards and Their Role in Video Communications," Signal Processing for Multimedia; J.S. Byrnes (Ed.); IOS Press; 1999; 28 pages.
Judgment: Final Written Decision, Determining All Challenged Claims Unpatentable, Denying Patent Owner's Motion to Amend as to Claim 15, Granting Patent Owner's Motion to Amend as to Claims 16-19, *Renesas Electronics Corporation* v. *Broadcom Corporation*, PTAB Case No. IPR2019-01040, Nov. 12, 2020; 89 pages.
Petition for *Inter Partes* Review, *Renesas Electronics Corporation* v. *Broadcom Corporation*, PTAB Case No. IPR2019-01040, May 6, 2019; 85 pages.
Exhibit 1002 [File History of the '844 Patent] to Petition for *Inter Partes* Review, *Renesas Electronics Corporation* v. *Broadcom Corporation*, PTAB Case No. IPR2019-01040; 394 pages.
Exhibit 1003 [Declaration of Dr. Alan C. Bovik] to Petition for *Inter Partes* Review, *Renesas Electronics Corporation* v. *Broadcom Corporation*, PTAB Case No. IPR2019-01040; 201 pages.
Exhibit 1007 [Excerpts of Bhaskaran et al., Image and Video Compression Standards, Algorithms and Architectures] to Petition for *Inter Partes* Review, *Renesas Electronics Corporation* v. *Broadcom Corporation*, PTAB Case No. IPR2019-01040; 23 pages.
Exhibit 1008 [Excerpts of IEEE 100 The Authoritative Dictionary of IEEE Standards Terms] to Petition for *Inter Partes* Review, *Renesas Electronics Corporation* v. *Broadcom Corporation*, PTAB Case No. IPR2019-01040; 4 pages.
Exhibit 1011 [Petitioner's Motion for Joinder, Paper 6; IPR2018-00013] to Petition for *Inter Partes* Review, *Renesas Electronics Corporation* v. *Broadcom Corporation*, PTAB Case No. IPR2019-01040; 10 pages.
Exhibit 1015 [Excerpts of Mitchell et al., MPEG Video Compression Standard (1996)] to Petition for *Inter Partes* Review, *Renesas Electronics Corporation* v. *Broadcom Corporation*, PTAB Case No. IPR2019-01040; 70 pages.
Exhibit 1016 [File History of the '073 Patent] to Petition for *Inter Partes* Review, *Renesas Electronics Corporation* v. *Broadcom Corporation*, PTAB Case No. IPR2019-01040; 592 pages.
Broadcom Corporation's Patent Owner Preliminary Response, *Renesas Electronics Corporation* v. *Broadcom Corporation*, PTAB Case No. IPR2019-01040, Aug. 22, 2019; 13 pages.
Exhibit 2001 [Notice of Institution of Investigation; ITC Inv. No. 337-TA-1119] to Petition for *Inter Partes* Review, *Renesas Electronics Corporation* v. *Broadcom Corporation*, PTAB Case No. IPR2019-01040; 5 pages.
Exhibit 2002 [Order No. 48: Initial Determination Partially Terminating Investigation with Respect to Complainant's Withdrawal of Certain Asserted Claims; ITC Inv. No. 337-TA-1119] to Petition for *Inter Partes* Review, *Renesas Electronics Corporation* v. *Broadcom Corporation*, PTAB Case No. IPR2019-01040; 4 pages.
Exhibit 2003 [Order No. 49: Initial Determination Partially Terminating Investigation with Respect to Additional Withdrawal Claims; ITC Inv. No. 337-TA-1119] to Petition for *Inter Partes* Review, *Renesas Electronics Corporation* v. *Broadcom Corporation*, PTAB Case No. IPR2019-01040; 4 pages.
Exhibit 2004 [Complainant Broadcom Corporation's Post-Hearing Reply Brief; ITC Inv. No. 337-TA-1119] to Petition for *Inter Partes* Review, *Renesas Electronics Corporation* v. *Broadcom Corporation*, PTAB Case No. IPR2019-01040; 165 pages.
Exhibit 2005 [Order No. 51: Initial Determination Extending Target Date; ITC Inv. No. 337-TA-1119] to Petition for *Inter Partes* Review, *Renesas Electronics Corporation* v. *Broadcom Corporation*, PTAB Case No. IPR2019-01040; 4 pages.
Petitioner's Reply to Patent Owner's Preliminary Response, *Renesas Electronics Corporation* v. *Broadcom Corporation*, PTAB Case No. IPR2019-01040, Sep. 6, 2019; 10 pages.
Exhibit 1018 [Email from Board dated Aug. 30, 2019] to Petition for *Inter Partes* Review, *Renesas Electronics Corporation* v. *Broadcom Corporation*, PTAB Case No. IPR2019-01040; 1 page.
Exhibit 1020 [Notice of the Commission's Final Determination of No Violation of Section 337; Termination of the Investigation; ITC Inv. No. 337-TA-1047] to Petition for *Inter Partes* Review, *Renesas Electronics Corporation* v. *Broadcom Corporation*, PTAB Case No. IPR2019-01040; 4 pages.
Exhibit 1021 [First Amended Complaint for Patent Infringement; E.D. Tex. 2:18-cv-00190] to Petition for *Inter Partes* Review, *Renesas Electronics Corporation* v. *Broadcom Corporation*, PTAB Case No. IPR2019-01040; 37 pages.
Exhibit 1022 [Order Granting Stay; E.D. Tex. 2:18-cv-00190] to Petition for *Inter Partes* Review, *Renesas Electronics Corporation* v. *Broadcom Corporation*, PTAB Case No. IPR2019-01040; 2 pages.
Broadcom's Sur-Reply to Petitioner's Reply to Patent Owner's Preliminary Response to Petition for *Inter Partes* Review, *Renesas Electronics Corporation* v. *Broadcom Corporation*, PTAB Case No. IPR2019-01040, Sep. 13, 2019; 8 pages.

(56) References Cited

OTHER PUBLICATIONS

Exhibit 2006 [District Court Case Docket for *Broadcom* v. *Toyota*, E.D. Tex. 2:18-cv-00190] to Petition for *Inter Partes* Review, *Renesas Electronics Corporation* v. *Broadcom Corporation*, PTAB Case No. IPR2019-01040; 7 pages.
Decision: Granting Institution of *Inter Partes* Review 35 U.S.C. § 314, *Renesas Electronics Corporation* v. *Broadcom Corporation*, PTAB Case No. IPR2019-01040, Nov. 13, 2019; 36 pages.
Patent Owner's Motion to Amend and Request for Preliminary Guidance, *Renesas Electronics Corporation* v. *Broadcom Corporation*, PTAB Case No. IPR2019-01040, Feb. 14, 2020; 32 pages.
Exhibit 2008 [U.S. Appl. No. 10/114,798, filed Apr. 1, 2002] to Petition for *Inter Partes* Review, *Renesas Electronics Corporation* v. *Broadcom Corporation*, PTAB Case No. IPR2019-01040; 47 pages.
Exhibit 2009 [Declaration of Scott T. Acton] to Petition for *Inter Partes* Review, *Renesas Electronics Corporation* v. *Broadcom Corporation*, PTAB Case No. IPR2019-01040; 102 pages.
Exhibit 2010 [Gibson et al., Digital Compression for Multimedia: Principles & Standards] to Petition for *Inter Partes* Review, *Renesas Electronics Corporation* v. *Broadcom Corporation*, PTAB Case No. IPR2019-01040; 9 pages.
Exhibit 2011 [Katsaggelos et al., Signal Recovery Techniques for Image and Video Compression and Transmission] to Petition for *Inter Partes* Review, *Renesas Electronics Corporation* v. *Broadcom Corporation*, PTAB Case No. IPR2019-01040; 9 pages.
Exhibit 2014 [von Roden, H.261 and MPEG1—A Comparison] to Petition for *Inter Partes* Review, *Renesas Electronics Corporation* v. *Broadcom Corporation*, PTAB Case No. IPR2019-01040; 7 pages.
Petitioner's Opposition to Patent Owner's Motion to Amend, *Renesas Electronics Corporation* v. *Broadcom Corporation*, PTAB Case No. IPR2019-01040, May 15, 2020; 47 pages.
Exhibit 1023 [Declaration of Dr. Alan C. Bovik in Support of Opposition to Motion to Amend] to Petition for *Inter Partes* Review, *Renesas Electronics Corporation* v. *Broadcom Corporation*, PTAB Case No. IPR2019-01040; 198 pages.
Exhibit 1028 [ITU-T Recommendation H.261, Video Codec for Audiovisual Services at p x 64 kbits] to Petition for *Inter Partes* Review, *Renesas Electronics Corporation* v. *Broadcom Corporation*, PTAB Case No. IPR2019-01040; 29 pages.
Exhibit 1030 [ISO/IEC JTC1/SC29/WG11 Coding of Moving Pictures and Audio, entitled "H.26LTest Model Long Term No. 8 (TML-8) draft0."] to Petition for *Inter Partes* Review, *Renesas Electronics Corporation* v. *Broadcom Corporation*, PTAB Case No. IPR2019-01040; 46 pages.
Exhibit 1031 [Bernacchia et al., A VLSI Implementation of a Reconfigurable Rational Filter] to Petition for *Inter Partes* Review, *Renesas Electronics Corporation* v. *Broadcom Corporation*, PTAB Case No. IPR2019-01040; 10 pages.
Patent Owner's Reply to Petitioner's Opposition to Patent Owner's Motion to Amend, *Renesas Electronics Corporation* v. *Broadcom Corporation*, PTAB Case No. IPR2019-01040, Jun. 19, 2020; 22 pages.
Exhibit 2015 [Declaration of Dr. Joseph P. Havlicek] to Petition for *Inter Partes* Review, *Renesas Electronics Corporation* v. *Broadcom Corporation*, PTAB Case No. IPR2019-01040; 65 pages.
Exhibit 2016 [Public Version—Respondents' Joint Post-Hearing Brief; ITC Inv. No. 337-TA-1119] to Petition for *Inter Partes* Review, *Renesas Electronics Corporation* v. *Broadcom Corporation*, PTAB Case No. IPR2019-01040; 330 pages.
Petitioner's Sur-Reply to Patent Owner's Reply to Petitioner's Opposition to Motion to Amend, *Renesas Electronics Corporation* v. *Broadcom Corporation*, PTAB Case No. IPR2019-01040, Jul. 29, 2020; 21 pages.
Petitioner's Submission of Demonstrative Exhibit & Exhibit List, *Renesas Electronics Corporation* v. *Broadcom Corporation*, PTAB Case No. IPR2019-01040, Aug. 12, 2020; 6 pages.
Exhibit 1033 [Petitioner's Demonstratives—Aug. 19, 2020] to Petition for *Inter Partes* Review, *Renesas Electronics Corporation* v. *Broadcom Corporation*, PTAB Case No. IPR2019-01040; 61 pages.
Patent Owner's Updated Exhibit List, *Renesas Electronics Corporation* v. *Broadcom Corporation*, PTAB Case No. IPR2019-01040, Aug. 12, 2020; 3 pages.
Exhibit 2017 [Patent Owner's Demonstratives] to Petition for *Inter Partes* Review, *Renesas Electronics Corporation* v. *Broadcom Corporation*, PTAB Case No. IPR2019-01040; 72 pages.
Decision, Denying Patent Owner's Request for Rehearing of Final Decision, *Renesas Electronics Corporation* v. *Broadcom Corporation*, PTAB Case No. IPR2019-01040, Apr. 15, 2021; 9 pages.
Lee B W et al: "Data Flow Processor for Multi-Standard Video Codec", Custom Integrated Circuits Conference, 1994, Proceedings of the IEEE 1994 San Diego, CA USA, May 1-4, 1994, New York, NY, USA, IEEE, May 1, 1994, pp. 103-106, XP010129914, ISBN: 0-7803-1886-2.
Bose S et al: "A Single Chip Multistandard Video Codec", Custom Integrated Circuits Conference, 1993, Proceedings of the IEEE 1993 San Diego, CA, USA, May 9-12, 1993, New York, NY, USA, IEEE, May 9, 1993, pp. 1141-1144, XP010222103, ISBN: 0-7803-0826-3.
Bailey D: "Programmable Vision Processor/Controller for Flexible Implementaion of Current and Future Image Compression Standards", IEEE Micro, IEEE Inc., New York, USA, vol. 12 No. 5, Oct. 1, 1992, pp. 33-39, XP000330855, ISSN: 0272-1732.
Herrmann K et al: "Design of a Development System for Multimedia applications Based on a Single Chip Mutliprocessor Array" Electronic, Circuits and Systems, 1996, ICECS '96, Proceedings of the Third IEEE International Conference on Rodos, Greece Oct. 13-16, 1996, New York, NY, USA, IEEE, Oct. 13, 1996, pp. 1151-1154, XP010217275, 0-7803-3650-X.
EP03007419 Search Report dated Jun. 22, 2005.

* cited by examiner

| | Functions | 612 Stage x | 614 Stage x+1 | 616 Stage x+2 | 618 Stage x+3 |
|---|---|---|---|---|---|
| | | ← MB time → | | ← MB time → | |
| 600 | Variable Length Decoding | $MB_i$ | $MB_{i+1}$ | $MB_{i+2}$ | $MB_{i+3}$ |
| 602 | Run length/ Inverse Scan /IQ/mismatch | | $MB_i$ | $MB_{i+1}$ | $MB_{i+2}$ |
| 604 | IDCT | | | $MB_i$ | $MB_{i+1}$ |
| 606 | PF Reference Fetch | | $MB_i$ | $MB_{i+1}$ | $MB_{i+2}$ |
| 608 | PF Reconstruction | | | $MB_i$ | $MB_{i+1}$ |
| 610 | MC Reconstruction | | | | $MB_i$ |

Video Decoding Pipeline based on MB decoding time.

620

| Functional Block | ← within a MB time → | |
|---|---|---|
| MIPS | MB header decoding (eg: MBA, MQ, MVs, CBP...) | • MV reconstruction<br>• Address calculation of PF reference fetch<br>• Flow control and status checking of IQ/IDCT/PF/MC |
| PVLD | Assist MIPS in MBlock header decoding | MB coeff decoding |

FIG. 6

VIDEO DECODING SYSTEM SUPPORTING MULTIPLE STANDARDS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

[CROSS-REFERENCE] *CROSS REFERENCE* TO RELATED APPLICATIONS

This *application is a reissue of U.S. patent application Ser. No. 13/608,221 filed Sep. 10, 2012* (*now U.S. Pat. No. 9,417,883*) *entitled, "Video Decoding System Supporting Multiple Standards," which* is a divisional application of and claims priority to U.S. patent application Ser. No. 10/114,798, filed on Apr. 1, 2002, having the title "VIDEO DECODING SYSTEM SUPPORTING MULTIPLE STANDARDS," and issued as U.S. Pat. No. 8,284,844 on Oct. 9, 2012, which is incorporated by reference herein as if expressly set forth in its entirety.

FIELD OF THE INVENTION

The present invention relates generally to video decoding systems, and more particularly to a video decoding system supporting multiple standards.

BACKGROUND

Digital video decoders decode compressed digital data that represent video images in order to reconstruct the video images. A relatively wide variety of encoding /decoding algorithms and encoding/decoding standards presently exist, and many additional algorithms and standards are sure to be developed in the future. The various algorithms and standards produce compressed video bit streams of a variety of formats. Some existing public format standards include MPEG -1, MPEG-2 (SD/HD), MPEG-4, H.263, H.263+ and H.26LIJVT. Also, private standards have been developed by Microsoft Corporation (Windows Media), RealNetworks, Inc., Apple Computer, Inc. (QuickTime), and others. It would be desirable to have a multi-format decoding system that can accommodate a variety of encoded bit stream formats, including existing and future standards, and to do so in a cost-effective manner.

A highly optimized hardware architecture can be created to address a specific video decoding standard, but this kind of solution is typically limited to a single format. On the other hand, a fully software based solution is often flexible enough to handle any encoding format, but such solutions tend not to have adequate performance for real time operation with complex algorithms, and also the cost tends to be too high for high volume consumer products. Currently a common software based solution is to use a general-purpose processor running in a personal computer, or to use a similar processor in a slightly different system. Sometimes the general-purpose processor includes special instructions to accelerate digital signal processor (DSP) operations such as multiply-accumulate (MAC); these extensions are intimately tied to the particular internal processor architecture. For example, in one existing implementation, an Intel Pentium processor includes an MMX instruction set extension. Such a solution is limited in performance, despite very high clock rates, and does not lend itself to creating mass market, commercially attractive systems.

Others in the industry have addressed the problem of accommodating different encoding/decocting algorithms by designing special purpose DSPs in a variety of architectures. Some companies have implemented Very Long Instruction Word (VLIW) architectures more suitable to video processing and able to process several instructions in parallel. In. these cases, the processors are difficult to program when compared to a general-purpose processor. Despite the fact that the DSP and VLIW architectures are intended for high performance, they still tend not to have enough performance for the present purpose of real time decoding of complex video algorithms. In special cases, where the processors are dedicated for decoding compressed video, special processing accelerators are tightly coupled to the instruction pipeline and are part of the core of the main processor.

Yet others in the industry have addressed the problem of accommodating different encoding/decoding algorithms by simply providing, multiple instances of hardware, each dedicated to a single algorithm. This solution is inefficient and is not cost-effective.

Further limitations and disadvantages of conventional and traditional approaches will become apparent to one of skill in the art through comparison of such systems with the present invention as set forth in the remainder of the present application with reference to the drawings.

SUMMARY

One aspect of the present invention is directed to a digital media decoding system having a processor and a hardware accelerator. The processor is adapted to control a decoding process. The hardware accelerator is coupled to the processor and performs a decoding function on a digital media data stream. The accelerator is configurable to perform the decoding function according to a plurality of decoding methods.

Another aspect of the present invention is directed to a method of decoding a digital media data stream. Pursuant to the method, in a first stage, a first decoding function is performed on an $i^{th}$ data element of the data stream with a first decoding accelerator. In a second stage, after the first stage, a second decoding function is performed on the $i^{th}$ data element with a second decoding accelerator, while the first decoding function is performed on an $i+1^{st}$ data element in the data stream with the first decoding accelerator.

Another aspect of the present invention is directed to a method of decoding a digital video data stream. Pursuant to the method, in a first stage, entropy decoding is performed on an $i^{th}$ data element of the data stream. In a second stage, after the first stage, inverse quantization is performed on a product of the entropy decoding of the $i^{th}$ data element, while entropy decoding is performed on an $i+1^{st}$ data element in the data stream.

Still another aspect of the present invention is directed to a method of decoding a digital media data stream. Pursuant to this method, media data of a first encoding/decoding format is received. At least one external decoding function is configured based on the first encoding/decoding format. Media data of the first encoding/decoding format is decoded using the at least one external decoding function. Media data of a second encoding/decoding format is received. The at least one external decoding function is configured based on the second encoding/decoding format. Then media data of the second encoding/decoding format is decoded using the at least one external decoding function.

It is understood that other embodiments of the present invention will become readily apparent to those skilled in the art from the following detailed description, wherein embodiments of the invention are shown and described only by way of illustration of the best modes contemplated for carrying out the invention. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

These and other features, aspects, and advantages of the present invention will become better understood with regard to the following description, appended claims, and accompanying drawings where:

FIG. 6 is a chart representing a decoding pipeline according to an illustrative embodiment of the present invention.

DETAILED DESCRIPTION OF THE EMBODIMENTS

Figure 1:
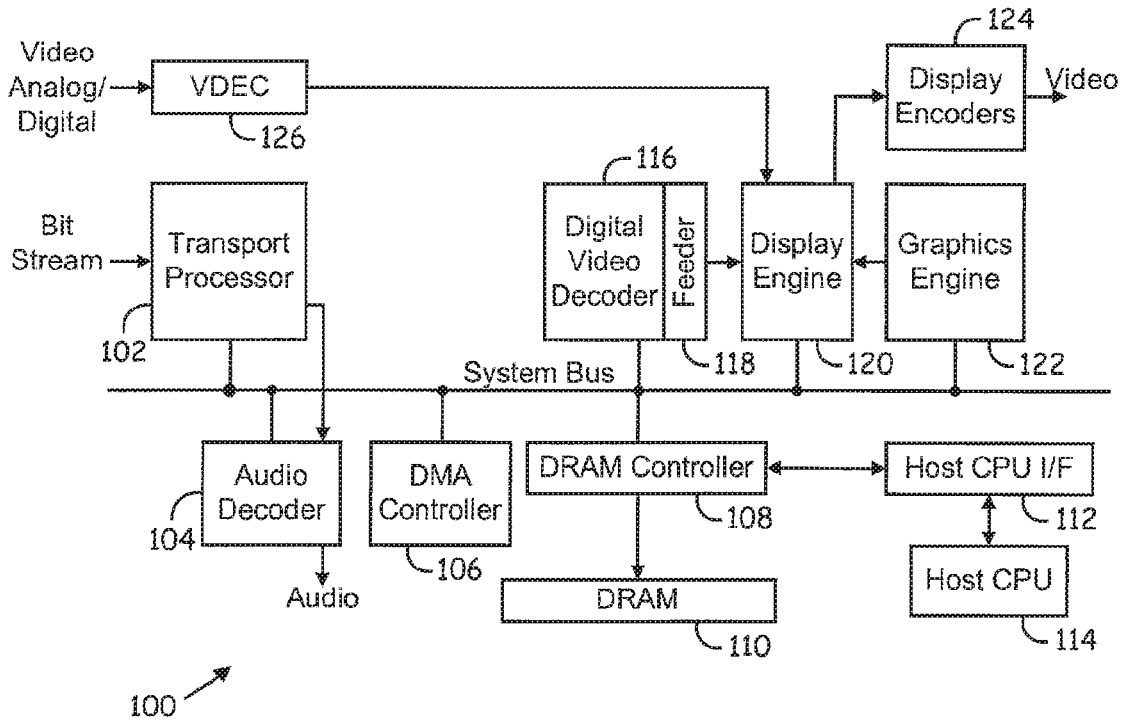
FIG. 1 is a functional block diagram of a digital media system in which the present invention may be illustratively employed.

The present invention forms an integral part of a complete digital media system and provides flexible and programmable decoding resources. FIG. 1 is a functional block diagram of a digital media system in which the present invention may be illustratively employed. It will be noted, however, that the present invention can be employed in systems of widely varying architectures and widely varying designs.

The digital media system of FIG. 1 includes transport processor 102, audio decoder 104, direct memory access (DMA) controller 106, system memory controller 108, system memory 110, host CPU interface 112, host CPU 114, digital video decoder 116, display feeder 118, display engine 120, graphics engine 122, display encoders 124 and analog video decoder 126. The transport processor 102 receives and processes a digital media data stream. The transport processor 102 provides the audio portion of the data stream to the audio decoder 104 and provides the video portion of the data stream to the digital video decoder 116. In one embodiment, the audio and video data is stored in main memory 110 prior to being provided to the audio decoder 104 and the digital video decoder 116. The audio decoder 104 receives the audio data stream and produces a decoded audio signal. DMA controller 106 controls data transfer amongst main memory 110 and memory units contained in elements such as the audio decoder 104 and the digital video decoder 116. The system memory controller 108 controls data transfer to and from system memory 110. In an illustrative embodiment, system memory 110 is a dynamic random access memory (DRAM) unit. The digital video decoder 116 receives the video data stream, decodes the video data and provides the decoded data to the display engine 120 via the display feeder 118. The analog video decoder 126 digitizes and decodes an analog video signal (NTSC or PAL) and provides the decoded data to the display engine 120. The graphics engine 122 processes graphics data in the data stream and provides the processed graphics data to the display engine 120. The display engine 120 prepares decoded video and graphics data for display and provides the data to display encoders 124, which provide an encoded video signal to a display device.

Figure 2:
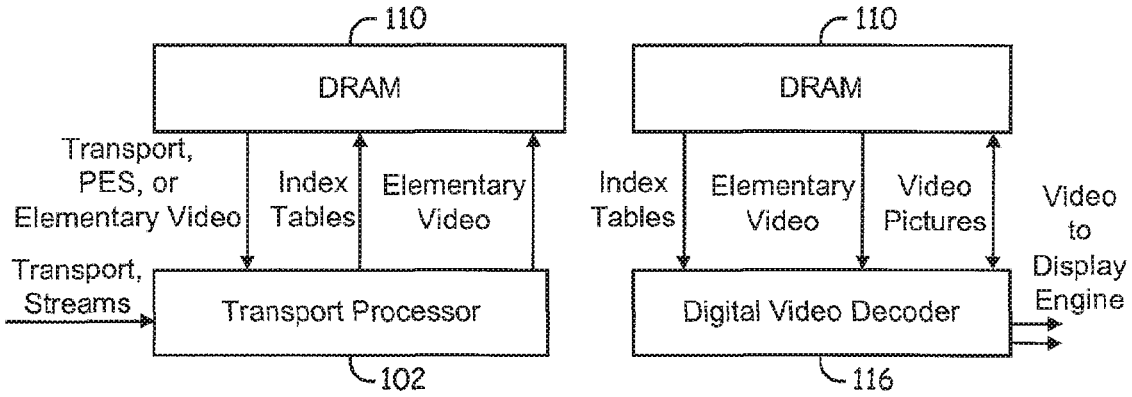
FIG. 2 is a functional block diagram demonstrating a video decode data flow according to an illustrative embodiment of the present invention.

FIG. 2 is a functional block diagram demonstrating a video decode data flow according to an illustrative embodiment of the present invention. Transport streams are parsed by the transport processor 102 and written to main memory 110 along with access index tables. The video decoder 116 retrieves the compressed video data for decoding, and the resulting decoded frames are written back to main memory 110. Decoded frames are accessed by the display feeder interface 118 of the video decoder for proper display by a display unit. In FIG. 2, two video streams are shown flowing to the display engine 120, suggesting that, in an illustrative embodiment, the architecture allows multiple display streams by means of multiple display feeders.

Aspects of the present invention relate to the architecture of digital video decoder 116. In accordance with the present invention, a moderately capable general purpose CPU with widely available development tools is used to decode a variety of coded streams using hardware accelerators designed as integral parts of the decoding process.

Specifically, the most widely-used compressed video formats fall into a general class of DCT-based, variable-length coded, block-motion-compensated compression algorithms. As mentioned above, these types of algorithms encompass a wide class of international, public and private standards, including MPEG-1, MPEG-2 (SD/HD), MPEG-4, H.263, H.263-F, H.26LINT, Microsoft Corp, Real Networks, QuickTime, and others. Fundamental functions exist that are common to most or all of these formats. Such functions include, for example, programmable variable-length decoding (VLD), arithmetic decoding (AC), inverse quantization (IQ), inverse discrete cosine transform (IDCT), pixel filtering (PF), motion compensation (MC), and deblocking/deringing (loop filtering or post-processing). The term "entropy decoding" may be used generically to refer to variable length decoding, arithmetic decoding, or variations on either of these. According to the present invention, these functions are accelerated by hardware accelerators.

However, each of the algorithms mentioned above implement some or all of these functions in different ways that prevent fixed hardware implementations from addressing all requirements without duplication of resources. In accordance with one aspect of the present invention, these hardware modules are provided with sufficient flexibility or programmability enabling a decoding system that decodes a variety of standards efficiently and flexibly.

The decoding system of the present invention employs high-level granularity acceleration with internal programmability or configurability to achieve the requirements above by implementation of very fundamental processing structures that can be configured dynamically by the core decoder processor. This contrasts with a system employing fine-granularity acceleration, such as multiply-accumulate (MAC), adders, multipliers, FFT functions, DCT functions, etc. In a fine-granularity acceleration system, the decompression algorithm has to be implemented with firmware that uses individual low-level instructions (such as MAC) to implement a high-level function, and each instruction runs on the core processor. In the high-level granularity system of the present invention, the firmware configures each hardware accelerator, which in turn represent high-level functions (such as motion compensation) that run (using a well-defined specification of input data) without intervention from the main core processor. Therefore, each hardware accelerator runs in parallel according to a processing pipeline dictated by the firmware in the core processor. Upon completion of the high-level functions, each accelerator notifies the main core processor, which in turn decides what the next processing pipeline step should be.

The software control typically consists of a simple pipeline that orchestrates decoding by issuing commands to each hardware accelerator module for each pipeline stage, and a status reporting mechanism that makes sure that all modules have completed their pipeline tasks before issuing the start of the next pipeline stage.

Figure 3:
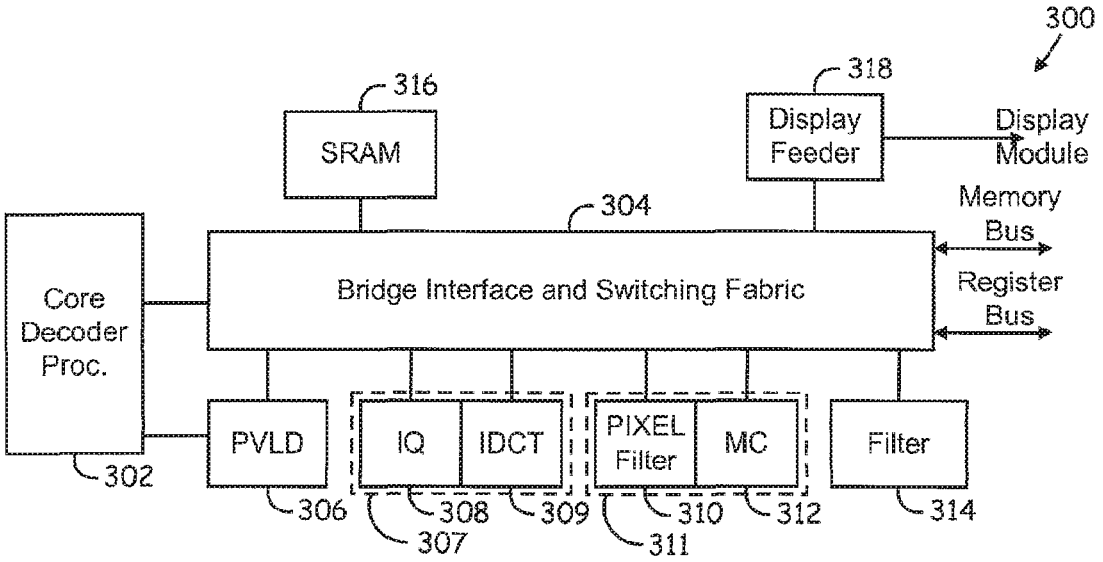
FIG. 3 is a high-level functional block diagram of a digital video decoding system according to an illustrative embodiment of the present invention.

FIG. 3 is a high-level functional block diagram of a digital video decoding system 300 according to an illustrative embodiment of the present invention. The digital video decoding system 300 of FIG. 3 can illustratively be employed to implement the digital video decoder 116 of FIGS. 1 and 2. The core processor 302 is the central control unit of the decoding system 300. The core processor 302 prepares the data for decoding. The core processor 302 also orchestrates the macroblock (MB) processing pipeline for all modules and fetches the required data from main memory via the bridge 304. The core processor 302 also handles some data processing tasks. Picture level processing, including sequence headers, GOP headers, picture headers, time stamps, macroblock-level information except the block coefficients, and buffer management, are performed directly and sequentially by the core processor 302, without using the accelerators 304, 306, 308, 309, 310, 312 and 314 other than the PVLD 306 (which accelerates general bitstream parsing). Picture level processing does not overlap with slice level/macroblock decoding in this embodiment.

Programmable variable length decoder (PVLD) 306, inverse quantizer 308, inverse transform module 309, pixel filter 310, motion compensation module 312 and loop/post filter 314 are hardware accelerators that accelerate special decoding tasks that would otherwise be bottlenecks for real-time video decoding if these tasks were handled by the core processor 302 alone. Each hardware module 306, 308, 309, 310, 312 and 314 is internally configurable or programmable to allow changes according to various processing algorithms. In an alternative embodiment, modules 308 and 309 are implemented in the form of a transform engine 307 that handles all functionality, but which is conceptually equivalent to the union of 308 and 309. In a further alternative embodiment, modules 310 and 312 are implemented in the form of a filter engine 311 which consists of an internal SIMD (single instruction multiple data) processor and a general purpose controller to interface to the rest of the system, but which is conceptually equivalent to the union of 310 and 312. In a further alternative embodiment, module 314 is implemented in the form of another filter engine similar to 311 which consists of an internal SIMD (single instruction multiple data) processor and a general purpose controller to interface to the rest of the system, but which is conceptually equivalent to 314. In a further alternative embodiment, module 314 is implemented in the form of the same filter engine 311 that can also implement the equivalent function of the combination of 310 and 311. Each hardware module 306, 308, 309, 310, 312 and 314 performs its task after being so instructed by the core processor 302. In-an illustrative embodiment of the present invention, each hardware module includes a status register that indicates whether the module has completed its assigned tasks. The ore processor 302 polls the status register to determine whether the hardware module has completed its task. In an alternative embodiment, the hardware accelerators share a status register.

In an illustrative embodiment, the PVLD engine 306 performs variable-length code (VLD) decoding of the block DCT coefficients. It also helps the core processor 302 to decode the header information in the compressed bitstream. In an illustrative embodiment of the present invention, the PVLD module 306 is designed as a coprocessor to the core processor 302, while the rest of the modules 308,309,310, 312 and 314 are designed as hardware accelerators. Also, in an illustrative embodiment, the PVLD module 306 includes two variable length decoders. Each of the two programmable variable-length decoders can be hardwired to efficiently perform decoding according to a particular video compression standard, such as MPEG2 HD. One of them can be optionally set as a programmable VLD engine, with a code RAM to hold VLC tables for media coding formats other than MPEG2. The two VLD engines are controlled independently by the core processor 302, and either one or both of them will be employed at any given time, depending on the application.

The IQ engine 308 performs run-level pair decoding, inverse scan and quantization. The inverse transform engine 309 performs IDCT operations or other inverse transform operations like the Integer Transform of the H.26x standards. In an illustrative embodiment of the present invention, the IQ module 308 and the inverse transform module 309 are part of a common hardware module and use a similar interface to the core processor 302.

The pixel filter 310 performs pixel filtering and interpolation. The motion compensation module 312 performs motion compensation. The pixel filter 310 and motion compensation module 312 are shown as one module in the diagram to emphasize a certain degree of direct cooperation between them. In an illustrative embodiment of the present invention, the PF module 310 and the MC module 312 are part of a common programmable module 311 designated as a filter engine capable of performing internal SIMD instructions to process data in parallel with an internal control processor.

The filter module 314 performs the de-blocking operation common in many low bit-rate coding standards. In one embodiment of the present invention, the filter module comprises a loop filter that performs de-blocking within the decoding loop. In another embodiment, the filter module comprises a post filter that performs de-blocking outside the decoding loop. In yet another embodiment, the filter module comprises a de-ringing filter, which may function as either a loop filter or a post filter, depending on the standard of the video being processed. In yet another embodiment, the filter module 314 includes both a loop filter and a post filter. Furthermore, in yet another embodiment, the filter module 314 is implemented using the same filter engine 311 implementation as for 310 and 312, except that module 311 is programmed to produce deblocked or deringed data as the case may be.

The bridge module 304 arbitrates and moves picture data between decoder memory 316 and main memory. The bridge interface 304 includes an internal bus network that includes arbiters and a direct memory access (DMA) engine. The bridge 304 serves as an interface to the system buses.

In an illustrative embodiment of the present invention, the display feeder module 318 reads decoded frames from main memory and manages the horizontal scaling and displaying of picture data. The display feeder 318 interfaces directly to a display module. In an illustrative embodiment, the display feeder 318 converts from 420 to 422 color space. Also, in an illustrative embodiment, the display feeder 318 includes multiple feeder interfaces, each including its own independent color space converter and horizontal scaler. The display feeder 318 handles its own memory requests via the bridge module 304.

Decoder memory 316 is used to store macroblock data and other time-critical data used during the decode process. Each hardware block 306, 308, 309, 310, 312, 314 accesses decoder memory 316 to either read the data to be processed or write processed data back. In an illustrative embodiment of the present invention, all currently used data is stored in decoder memory 316 to minimize accesses to main memory. Each hardware module 306, 308, 309, 310, 312, 314 is assigned one or more buffers in decoder memory 316 for data processing. Each module accesses the data in decoder memory 316 as the macro blocks are processed through the system. In an exemplary embodiment, decoder memory 316 also includes parameter buffers that are adapted to hold parameters that are needed by the hardware modules to do their job at a later macroblock pipeline stage. The buffer addresses are passed to the hardware modules by the core processor 302. In an illustrative embodiment, decoder memory 316 is a static random access memory (SRAM) unit.

Figure 4A:
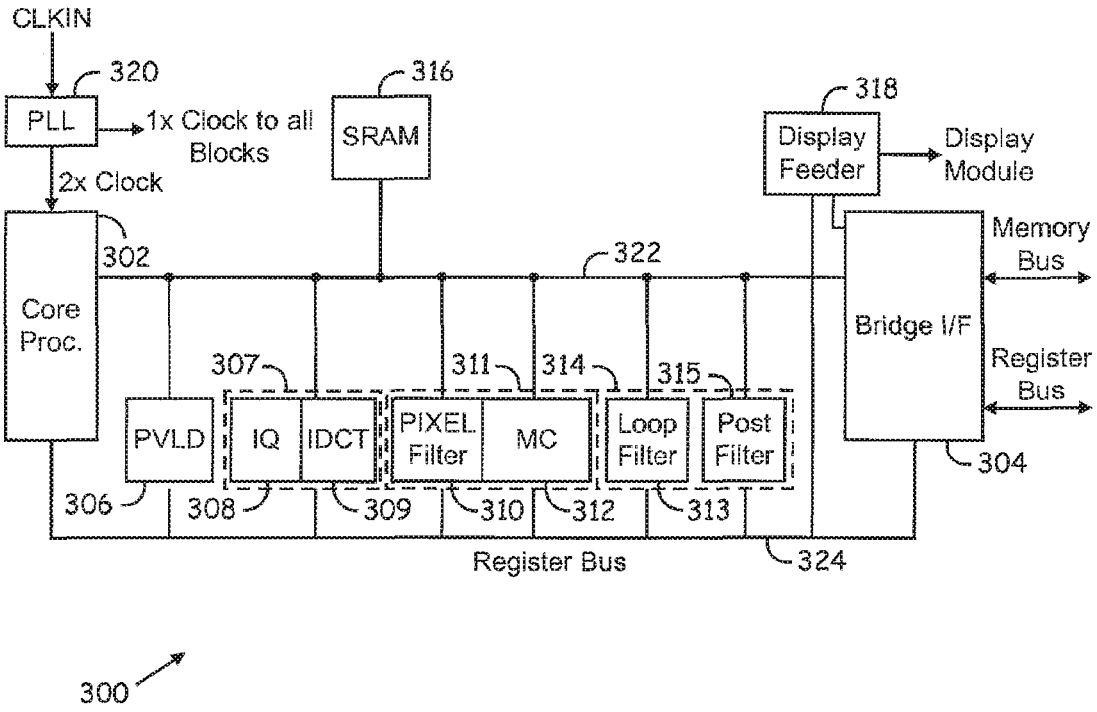
FIG. 4a is a functional block diagram of a digital video decoding system according to an illustrative embodiment of the present invention.

FIG. 4a is a functional block diagram of digital video decoding system 300 according to an illustrative embodiment of the present invention. In FIG. 4a, elements that are common to FIG. 3 are given like reference numbers. In FIG. 4a, various elements are grouped together to illustrate a particular embodiment where 308 and 309 form part of a transform engine 307, 310 and 312 form part of a filter engine 311 that is a programmable module that implements the functionality of PF and MC, 313 and 315 form part of another filter engine 314 which is another instance of the same programmable module except that it is programmed to implement the functionality of a loop filter 313 and a post filter 315. In addition to the elements shown in FIG. 3, FIG. 4a shows, phase-locked loop (PLL) element 320, internal data bus 322, register bus 324 and separate loop and post filters 313 and 315 embodied in a filter engine module 314 which implements the functionality of 313 and 315.

The core processor 302 is the master of the decoding system 300. It controls the data flow of decoding processing. All video decode processing, except where otherwise noted, is performed in the core processor. The PVLD 306, IQ 308, inverse transform 309, PF 310 and MC 312, and filter 314 are hardware accelerators to help the core processor achieve the required performance. In an illustrative embodiment of the present invention, the core processor 302 is a MIPS processor, such as a MIPS32 implementation, for example. The core processor 302 incorporates a D cache and an I cache. The cache sizes are chosen to ensure that time critical operations are not impacted by cache misses. For example, instructions for macroblock-level processing of MPEG-2 video runs from cache. For other algorithms, time-critical code and data also reside in cache. The determination of exactly which functions are stored in cache involves a trade-off between cache size, main memory access time, and the degree of certainty of the firmware implementation for the various algorithms. The cache behavior with proprietary algorithms depends in part in the specific software design. In an illustrative embodiment, the cache sizes are 16 kB for instructions and 4 kB for data. These can be readily expanded if necessary.

At the macroblock level, the core processor 302 interprets the decoded bits for the appropriate headers and decides and coordinates the actions of the hardware blocks 306, 308, 309, 310, 312 and 314. Specifically, all macroblock header information, from the macroblock address increment (MBAinc) to motion vectors (MV s) and to the cbp pattern in the case of MPEG2 decoding, for example, is derived by the core processor 302. The core processor 302 stores related information in a particular format or data structure (determined by the hardware module specifications) in the appropriate buffers in the decoder memory 316. For example, the quantization scale is passed to the buffer the IQ engine 308; macroblock type, motion type and pixel precision are stored in the parameter buffer for the pixel filter engine 310. The core processor keeps track of certain information in order to maintain the correct pipeline, and it may store some such information in its D cache, some in main system memory and some in the decoder memory 316, as required by the specific algorithm being performed. For example, for some standards, motion vectors of the macroblock are kept as the predictors for future motion vector derivation.

In an illustrative embodiment the programmable variable length decoder 306 performs decoding of variable length codes (VLC) in the compressed bit stream to extract values, such as DCT coefficients, from the compressed data stream. Different coding formats generally have their own unique VLC tables. The PVLD 306 is completely configurable in terms of the VLC tables it can process. The PVLD 306 can accommodate a dynamically changing set of VLC tables, for example they may change on a macroblock-to-macroblock basis. In an illustrative embodiment of the present invention, the PVLD 306 includes a register that the core processor can program to guide the PVLD 306 to search for the VLC table of the appropriate encoding/decoding algorithm. The PVLD 306 decodes variable length codes in as little as one clock, depending on the specific code table in use and the specific code being decoded.

The PVLD 306 is designed to support the worst-case requirement for VLD operation with MPEG-2 HDTV (MP@HL), while retaining its full programmability. The PVLD 306 includes a code table random access memory (RAM) for fastest performance. Code tables such a MPEG-2 video can fit entirely within the code RAM. Some formats, such as proprietary formats, may require larger code tables that do not fit entirely within the code RAM in the PVLD 306. For such cases, the PVLD 306 can make use of both the decoder memory 316 and the main memory as needed. Performance of VLC decoding is reduced somewhat when codes are searched in video memory 316 and main memory. Therefore, for formats that require large tables of VLC codes, the most common codes are typically stored in the PVLD code RAM, the next most common codes are stored in decoder memory, and the least common codes are stored in main memory. Also, such codes are stored in decoder memory 316 and main memory such that even when extended look-ups in decoder memory 316 and main memory are required, the most commonly occurring codes are found more quickly. This allows the overall performance to remain exceptionally high.

In an illustrative embodiment of the present invention, the PVLD 306 is architected as a coprocessor of the core processor 302. That is, it can operate on a single-command basis where the core processor issues a command (via a coprocessor instruction) and waits (via a Move From Coprocessor instruction) until it is executed by the PVLD 306, without polling to determine completion of the command. This increases performance when a large number of VLC codes are parsed under software control. Additionally, the PVLD 306 can operate on a block-command basis where the core processor 302 commands the PVLD 306 to decode a complete block of VLC codes, such as DCT coefficients, and the core processor 302 continues to perform other tasks in parallel. In this case, the core processor 302 verifies the completion of the block operation by checking a status bit in the PVLD 306. The PVLD produces results (tokens) that are stored in decoder memory 316.

The PVLD 306 checks for invalid codes and recovers gracefully from them. Invalid codes may occur in the coded bit stream for a variety of reasons, including errors in the video encoding, errors in transmission, and improper discontinuities in the stream.

The inverse quantizer module 308 performs run-level code (RLC) decoding, inverse scanning (also called zig-zag scanning), inverse quantization and mismatch control. The coefficients, such as DCT coefficients, extracted by the PVLD 306 are processed by the inverse quantizer 308 to bring the coefficients from the quantized domain to the DCT domain. In an exemplary embodiment of the present invention, the IQ module 308 obtains its input data (run-level values) from the decoder memory 316, as the result of the PVLD module 306 decoding operation. In an alternative embodiment, the IQ module 308 obtains its input data directly from the PVLD 306. This alternative embodiment is illustratively employed in conjunction with encoding/decoding algorithms that are relatively more involved, such as MPEG-2 HD decoding, for best performance. The run-length, value and end-of-block codes read by the IQ module 308 are compatible with the format created by the PVLD module when it decodes blocks of coefficient VLCs, and this format is not dependent on the specific video coding format being decoded. In an exemplary embodiment, the IQ 308 and inverse transform 309 modules form part of a tightly coupled module labeled transform engine 307. This embodiment has the advantage of providing fast communication between modules 308 and 309 by virtue of being implemented in the same hardware block.

The scan pattern of the IQ module 308 is programmable in order to be compatible with any required pattern. The quantization format is also programmable, and mismatch control supports a variety of methods, including those specified in MPEG-2 and MPEG-4. In an exemplary embodiment, the IQ module 308 can accommodate block sizes of 16×16, 8×8, 8×4, 4×8 and 4×4. In an illustrative embodiment of the present invention, the IQ module 308 includes one or more registers that are used to program the scan pattern, quantization matrix and mismatch control method. These registers are programmed by the core processor 302 to dictate the mode of operation of the IQ module. The IQ module 306 is designed in such a way that the core processor 302 can intervene at any point in the process, in case a particular decoding algorithm requires software processing of some aspect of the algorithmic steps performed by the IQ module 308. For example, there may be cases where an unknown algorithm could require a different form of rounding; this can be performed in the core processor 302. The IQ module 308 has specific support for AC prediction as specified in MPEG-4 Advanced Simple Profile. In an exemplary embodiment, the IQ module 308 also has specific support for the inverse quantization functions of the ISO-ITU NT (Joint Video Team) standard under development.

The inverse transform module 309 performs the inverse transform to convert the coefficients produced by the IQ module 308 from the frequency domain to the spatial domain. The primary transform supported is the IDCT, as specified in MPEG-2, MPEG-4, IEEE, and several other standards. The coefficients are programmable, and it can support alternative related transforms, such as the "linear" transform in H.26L (also known as JVT), which is not quite the same as IDCT. The inverse transform module 309 supports a plurality of matrix sizes, including 8×8, 4×8, 8×4 and 4×4 blocks. In an illustrative embodiment of the present invention, the inverse transform module 309 includes a register that is used to program the matrix size. This register is programmed by the core processor 302 according to the appropriate matrix size for the encoding/decoding format of the data stream being decoded.

In an illustrative embodiment of the present invention, the coefficient input to the inverse transform module 309 is read from decoder memory 316, where it was placed after inverse quantization by the IQ module 308. The transform result is written back to decoder memory 316. In an exemplary embodiment, the inverse transform module 309 uses the same memory location in decoder memory 316 for both its input and output, allowing a savings in on-chip memory usage. In an alternative embodiment, the coefficients produced by the IQ module are provided directly to the inverse transform module 309, without first depositing them in decoder memory 316. To accommodate this direct transfer of coefficients, in one embodiment of the present invention, the IQ module 308 and inverse transform module 309 use a common interface directly between them for this purpose. In an exemplary embodiment, the transfer of coefficients from the IQ module 308 to the inverse transform module 309 can be either direct or via decoder memory 316. For encoding/decoding algorithms that require very high rates of throughput, such as MPEG-2 HD decoding, the transfer is direct in order to save time and improve performance.

Figure 4B:
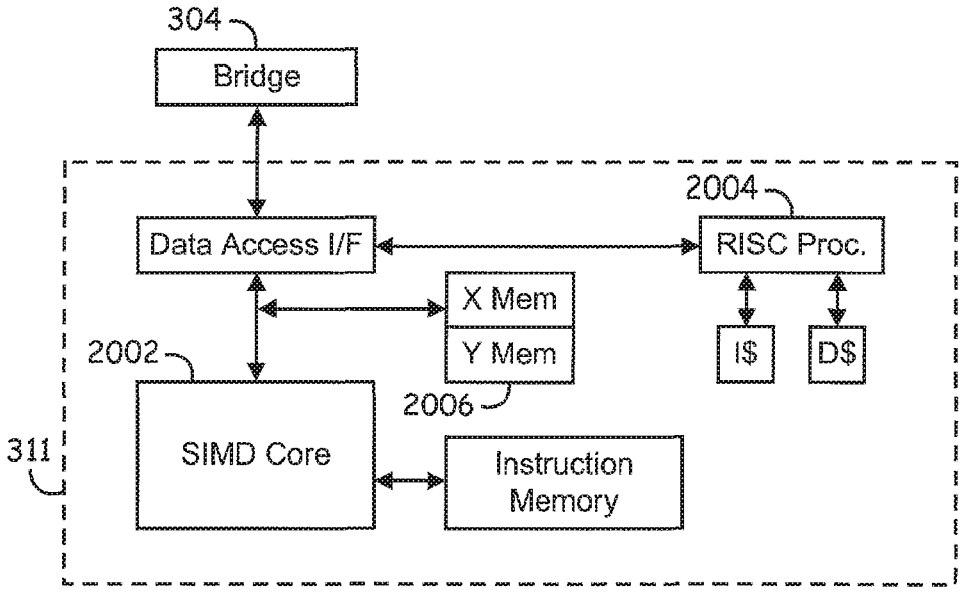
FIG. 4b is a functional block diagram of a motion compensation filter engine according to an illustrative embodiment of the present invention.

In an illustrative embodiment, the functionality of the PF 310 and MC 312 are implemented by means of a filter engine (FE) 311. The FE is the combination of an 8-way SIMD processor 2002 and a 32-bit RISC processor 2004, illustrated in FIG. 4b. Both processors operate at the same clock frequency. The SIMD engine 2002 is architected to be very efficient as a coprocessor to the RISC processor (internal MIPS) 2004, performing specialized filtering and decision-making tasks. The SIMD 2002 includes: a split X-memory 2006 (allowing simultaneous operations), a Y-memory, a Z-register input with byte shift capability, 16 bit per element inputs, and no branch or jump functions. The SIMD processor 2002 has hardware for three-level looping, and it has a hardware function call and return mechanism for use as a coprocessor. All of these help to improve performance and minimize the area. The RISC processor 2004 controls the operations of the FE 311. Its functions include the control of the data flow and scheduling tasks. It also takes care of part of the decision-making functions. The FE 311 operates like the other modules on a macro block basis under the control of the mum core processor 302.

Referring again to FIG. 4a, the pixel filter 310 performs pixel filtering and interpolation as part of the motion compensation process. Motion compensation uses a small piece of an image from a previous frame to predict a piece of the current image; typically the reference image segment is in a different location within the reference frame. Rather than recreate the image anew from scratch, the previous image is used and the appropriate region of the image moved to the proper location within the frame; this may represent the image accurately, or more generally there may still be a need for coding the residual difference between this prediction and the actual current image. The new location is indicated by motion vectors that denote the spatial displacement in the frame with respect to the reference frame.

The pixel filter 310 performs the interpolation necessary when a reference block is translated (motion-compensated) by a vector that cannot be represented by an integer number of whole-pixel locations. For example, a hypothetical motion vector may indicate to move a particular block 10.5 pixels to the right and 0.25 pixels down for the motion-compensated prediction. In an illustrative embodiment of the present invention, the motion vectors are decoded by the PVLD 3D6 in a previous processing pipeline stage and are further processed in the core processor 302 before being passed to the pixel filter, typically via the decoder memory 316. Thus, the pixel filter 310 gets the motion information as vectors and not just bits from the bitstream. In an illustrative embodiment, the reference block data that is used by the motion compensation process is read by the pixel filter 310 from the decoder memory 316, the required data having been moved to decoder memory 316 from system memory 110; alternatively the pixel filter obtains the reference block data from system memory 110. Typically the pixel filter obtains the processed motion vectors from decode memory 316. The pixel data that results from motion compensation of a given macroblock is stored in memory after decoding of said macroblock is complete. In an illustrative embodiment, the decoded macroblock data is written to decoder memory 316 and then transferred to system memory 110; alternatively, the decoded macro block data may be written directly to system memory 110. If and when that decoded macroblock data is needed for additional motion compensation of another macroblock, the pixel filter 310 retrieves the reference macroblock pixel information from memory, as above, and again the reconstructed macroblock pixel information is written to memory, as above.

The pixel filter 310 supports a variety of filter algorithms, including ½ pixel and ¼ pixel interpolations in either or both of the horizontal and vertical axes; each of these can have many various definitions, and the pixel filter can be configured or programmed to support a wide variety of filters, thereby supporting a wide range of video formats, including proprietary formats. The PF module can process block sizes of 4, 8 or 16 pixels per dimension (horizontal and vertical), or even other sizes if needed. The pixel filter 310 is also programmable to support different interpolation algorithms with different numbers of filter taps, such as 2, 4, or 6 taps per filter, per dimension. In an illustrative embodiment of the present invention, the pixel filter 309 includes one or more registers that are used to program the filter algorithm and the block size. These registers are programmed by the core processor 302 according to the motion compensation technique employed with the encoding/decoding format of the data stream being decoded. In another illustrative embodiment, the pixel filter is implemented using the filter engine (FE) architecture, which is programmable to support any of a wide variety of filter algorithms. As such, in either type of embodiment, it supports a very wide variety of motion compensation schemes.

The motion compensation module 312 reconstructs the macroblock being decoded by performing the addition of the decoded difference (or residual or "error") pixel information from the inverse transform module 309 to the pixel prediction data from the output of the pixel filter 310. The motion compensation module 312 is programmable to support a wide variety of block sizes, including 16×16, 16×8, 8×16, 8×8, 8×4, 4×8 and 4×4. The motion compensation module 312 is also programmable to support different transform block types, such as field-type and frame-type transform blocks. The motion compensation module 312 is further programmable to support different matrix formats. Furthermore, MC module 312 supports all the intra and inter prediction modes in the H.26L/JVT proposed standard. In an illustrative embodiment of the present invention, the motion compensation module 312 includes one or more registers that are configurable to select the block size and format. These registers are programmed by the core processor 302 according to the motion compensation technique employed with the encoding/decoding format of the data stream being decoded. In another illustrative embodiment, the motion compensation module is a function of a filter engine (FE) that is serving as the pixel filter and motion compensation modules, and it is programmable to perform any of the motion compensation functions and variations that are required by the format being decoded.

The loop filter 313 and post filter 315 perform de-blocking filter operations. In an illustrative embodiment of the present invention, the loop filter 313 and post filter 315 are combined in one filter module 314, as shown in FIG. 3. The filter module 314 in an illustrative embodiment is the same processing structure as described for 311, except that it is programmed to perform the functionality of 313 and 315. Some decoding algorithms employ a loop filter and others employ a post filter. Therefore, the filter module 314 (or loop filter 313 and post filter 315 independently) is programmable to turn on either the loop filter 313 or the post filter 315 or both. In an illustrative embodiment, the filter module 314 (or loop filter 313 and post filter 315) has a register that controls whether a loop filter or post filter scheme is employed. The core processor 302 programs the filter module register(s) according to the bit-stream semantics. The loop filter 313 and post filter 315 each have programmable coefficients and thresholds for performing a variety of de-blocking algorithms in either the horizontal or vertical directions. Deblocking is required in some low bit-rate algorithms. De-blocking is not required in MPEG-2. However, in one embodiment of the present invention, de-blocking is used to advantage with MPEG-2 at low bit rates.

In one embodiment of the present invention, the input data to the loop filter 313 and post filter 315 comes from decoder memory 316, the input pixel data having been transferred from system memory 110 as appropriate, typically at the direction of the core processor 302. This data includes pixel and block/macroblock parameter data generated by other modules in the decoding system 300. The output data from the loop filter 313 and post filter 315 is written into decoder memory 316. The core processor 302 then causes the processed data to be put in its correct location in system memory 110. The core processor 302 can program operational parameters into loop filter 313 and post filter 315 registers at any time. In an illustrative embodiment, all parameter registers are double buffered. In another illustrative embodiment the loop filter 313 and post filter 315 obtain input pixel data from system memory 110, and the results may be written to system memory 110.

The loop filter 313 and post filter 315 are both programmable to operate according to any of a plurality of different encoding/decoding algorithms. In the embodiment wherein loop filter 313 and post filter 315 are separate hardware units, the loop filter 313 and post filter 315 can be programmed similarly to one another. The difference is where in the processing pipeline each filter 313, 315 does its work. The loop filter 313 processes data within the reconstruction loop and the results of the filter are used in the actual reconstruction of the data. The post filter 315 processes data that has already been reconstructed and is fully decoded in the two-dimensional picture domain. In an illustrative embodiment of the present invention, the coefficients, thresholds and other parameters employed by the loop filter 313 and the post filter 315 (or, in the alternative embodiment, filter module 314) are programmed by the core processor 302 according to the de-blocking technique employed with the encoding/decoding format of the data stream being decoded.

The core processor 302, bridge 304, PVLD 306, IQ 308, inverse transform module 309, pixel filter 310, motion compensation module 312, loop filter 313 and post filter 315 have access to decoder memory 316 via the internal bus 322 or via equivalent functionality in the bridge 304. In an exemplary embodiment of the present invention, the PVLD 306, IQ 308, inverse transform module 309, pixel filter 310, motion compensation module 312, loop filter 313 and post filter 315 use the decoder memory 316 as the source and destination memory for their normal operation. In another embodiment, the PL VD 306 uses the system memory 110 as the source of its data in normal operation. In another embodiment, the pixel filter 310 and motion compensation module 312, or the equivalent function in the filter module 314, use the decoder memory 316 as the source for residual pixel information and they use system memory 110 as the source for reference pixel data and as the destination for reconstructed pixel data. In another embodiment, the loop filter 313 and post processor 315, or the equivalent function in the filter module 314, use system memory 110 as the source and destination for pixel data in normal operation. The CPU has access to decoder memory 316, and the DMA engine 304 can transfer data between decoder memory 316 and the main system memory 110. The arbiter for decoder memory 316 is in the bridge module 304. In an illustrative embodiment, decoder memory 316 is a static random access memory (SRAM) unit.

The bridge module 304 performs several functions. In an illustrative embodiment, the bridge module 304 includes an interconnection network to connect all the other modules of the MVP as shown schematically as internal bus 322 and register bus 324. It is the bridge between the various modules of decoding system 300 and the system memory. It is the bridge between the register bus 324, the core processor 302, and the main chip-level register bus. It also includes a DMA engine to service the memories within the decoder system 300, including decoder memory 316 and local memory units within individual modules such as PVLD 306. The bridge module illustratively includes an asynchronous interface capability and it supports different clock rates in the decoding system 300 and the main memory bus, with either clock frequency being greater than the other.

The bridge module 304 implements a consistent interface to all of the modules of the decoding system 300 where practical. Logical register bus 324 connects all the modules and serves the purpose of accessing control and status registers by the main core processor 302. Coordination of processing by the main core processor 302 is accomplished by a combination of accessing memory, control and status registers for all modules.

In an illustrative embodiment of the present invention, the display feeder 318 module reads decoded pictures (frames or fields, as appropriate) from main memory in their native decoded format (4:2:0, for example), converts the video into 4:2:2 format, and performs horizontal scaling using a polyphase filter. According to an illustrative embodiment of the present invention, the coefficients, scale factor, and the number of active phases of the polyphase filter are programmable. In an illustrative embodiment of the present invention, the display feeder 318 includes one or more registers that are used to program these parameters. These registers are programmed by the core processor 302 according to the desired display format. In an exemplary embodiment the polyphase filter is an 8 tap, 11 phase filter. The output is illustratively standard 4:2:2 format YCrCb video, in the native color space of the coded video (for example, ITU-T 709-2 or ITU-T 601-B color space), and with a horizontal size that ranges, for example, from 160 to 1920 pixels. The horizontal scaler corrects for coded picture sizes that differ from the display size, and it also provides the ability to scale the video to arbitrary smaller or larger sizes, for use in conjunction with subsequent 2-dimensional scaling where required for displaying video in a window, for example. In one embodiment, the display feeder 318 is adapted to supply two video scan lines concurrently, in which case the horizontal scaler in the feeder 318 is adapted to scale two lines concurrently, using identical parameters.

Figure 5:
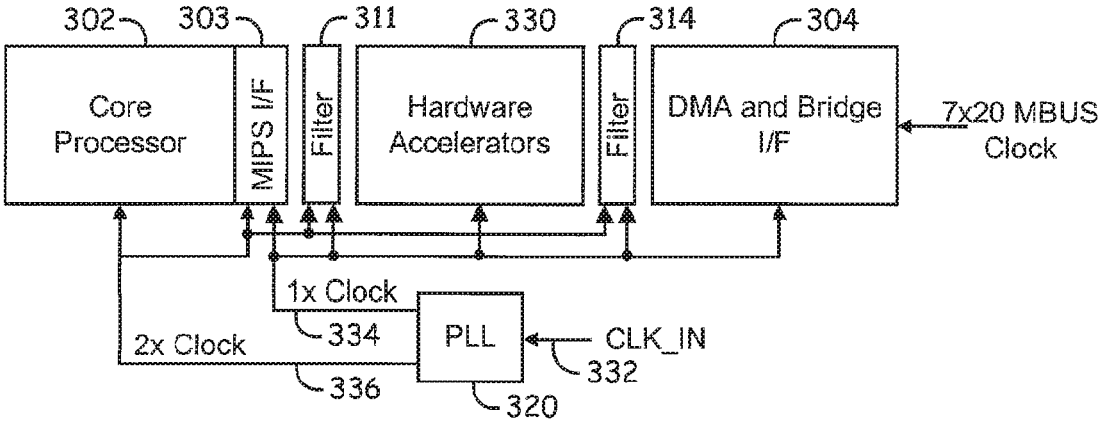
FIG. 5 is a block diagram depicting a clocking scheme for a decoding system according to an illustrative embodiment of the present invention.

FIG. 5 is a block diagram depicting a clocking scheme for decoding system 300 according to an illustrative embodiment of the present invention. In FIG. 5, elements that are common to FIGS. 3 and 4 are given like reference numbers. Hardware accelerators block 330 includes PVLD 306, IQ 308, inverse transform module 309, pixel filter 310, motion compensation module 312 and filter engine 314. In an illustrative embodiment of the present invention, the core processor 302 runs at twice the frequency of the other processing modules. In another related illustrative embodiment, hardware accelerator block 330 includes PVLD 306, IQ 308, and inverse transform module 309, while one instance of the filter engine module 311 implements pixel filter 310 and motion compensation 312, and yet another instance of the filter module 314 implements loop filter 313 and post filter 315, noting that FE 311 and FE 314 receive both 243 MHz and 121.5 MHz clocks. In an exemplary embodiment, the core processor runs at 243 MHz and the individual modules at half this rate, i.e., 121.5 MHz. An elegant, flexible and efficient clock strategy is achieved by generating two internal clocks in an exact 2:1 relationship to each other. The system clock signal (CLK_IN) 332 is used as input to the phase locked loop element (PLL) 320, which is a closed-loop feedback control system that locks to a particular phase of the system clock to produce a stable signal with little jitter. The PLL element 320 generates a IX clock (targeting, e.g., 121.5 MHz) for the hardware accelerators 330, bridge 304 and the core processor bus interface 303, while generating a 2X clock (targeting, e.g., 243 MHz) for the core processor 302 and the core processor bus interface 303.

Referring again to FIGS. 3 and 4, for typical video formats such as MPEG-2, picture level processing, from the sequence level down to the slice level, including the sequence headers, picture headers, time stamps, and buffer management, are performed directly and sequentially by the core processor 302. The PVLD 306 assists the core processor when a bit-field in a header is to be decoded. Picture level processing does not overlap with macroblock level decoding.

The macroblock level decoding is the main video decoding process. It occurs within a direct execution loop. In an illustrative embodiment of the present invention, hardware blocks PVLD 306, IQ 308, inverse transform module 309, pixel filter 310, motion compensation module 312 (and, depending on which decoding algorithm is being executed, possibly loop filter 313) are all involved in the decoding loop. The core processor 302 controls the loop by polling the status of each of the hardware blocks involved.

Still another aspect of the present invention is directed to a method of decoding a digital media data stream. Pursuant to this method, media data of a first encoding/decoding format is received. At least one external decoding function, such as variable-length decoding or inverse quantization, e.g., is configured based on the first encoding/decoding format. Media data of the first encoding/decoding format is decoded using the at least one external decoding function. Media data of a second encoding/decoding, format is received. The at least one external decoding function is configured based on the second encoding/decoding format. Then media data of the second encoding/decoding format is decoded using the at least one external decoding function.

In an illustrative embodiment of the present invention, the actions of the various hardware blocks are arranged in an execution pipeline comprising a plurality of stages. As used in the present application, the term "stage" can refer to all of the decoding functions performed during a given time slot, or it can refer to a functional step, or group of functional steps, in the decoding process. The pipeline scheme aims to achieve maximum throughput in defined worst case decoding scenarios. Pursuant to this objective, it is important to utilize the core processor efficiently. FIG. 6 is a chart representing a decoding pipeline according to an illustrative embodiment of the present invention. The number of decoding functions in the pipeline may vary depending on the target applications. Due to the selection of hardware elements that comprise the pipeline, the pipeline architecture of the present invention can accommodate, at least, substantially any existing or future compression algorithms that fall into the general class of block-oriented algorithms.

The rows of FIG. 6 represent the decoding functions performed as part of the pipeline according to an exemplary embodiment. Variable length decoding 600 is performed by PVLD 306. Run length/inverse scan/IQ/mismatch 602 are functions performed by IQ module 308. Inverse transform operations 604 are performed by the inverse transform module 309. Pixel filter reference fetch 606 and pixel filter reconstruction 608 are performed by pixel filter 310. Motion compensation reconstruction 610 is performed by motion compensation module 312. The columns of FIG. 6 represent the pipeline stages. The designations $MB_i$, $MB_{i+2}$, etc. represent the $i^{th}$ macroblock in a data stream, the $i+1^{st}$ macroblock in the data stream, the $i+2^{nd}$ macroblock, and so on. The pipeline scheme supports one pipeline stage per module, wherein any hardware module that depends on the result of another module is arranged in a following MB pipeline stage. In an illustrative embodiment, the pipeline scheme can support more than one pipeline stage per module.

At any given stage in the pipeline, while a given function is being performed on a given macroblock, the next macroblock in the data stream is being worked on by the previous function in the pipeline. Thus, at stage x 612 in the pipeline represented in FIG. 6, variable length decoding 600 is performed on MBi. Exploded view 620 of the variable length decoding function 600 demonstrates how functions are divided between the core processor 302 and the PVLD 306 during this stage, according to one embodiment of the present invention. Exploded view 620 shows that during stage x 612, the core processor 302 decodes the macmblock header of $MB_i$. The PVLD 306 assists the core processor 302 in the decoding of macroblock headers. The core processor 302 also reconstructs the motion vectors of $MB_i$, calculates the address of the pixel filter reference fetch for $MB_i$, performs pipeline flow control and checks the status of IQ module 308, inverse transform module 309, pixel filter 310 and motion compensator 312 during stage x 612. The hardware blocks operate concurrently with the core processor 302 while decoding a series of macroblocks. The core processor 302 controls the pipeline, initiates the decoding of each macroblock, and controls the operation of each of the hardware accelerators. The core processor firmware checks the status of each of the hardware blocks to determine completion of previously assigned tasks and checks the buffer availability before advancing the pipeline. Each block will then process the corresponding next macroblock. The PVLD 306 also decodes the macro block coefficients of Mbi during stage x. Block coefficient VLC decoding is not started until the core processor 302 decodes the whole macro block header. Note that the functions listed in exploded view 620 are performed during each stage of the pipeline of FIG. 6, even though, for simplicity's sake, they are only exploded out with respect to stage x 612.

At the next stage x+1 614, the inverse quantizer 308 works on $MB_i$ (function 602) while variable length decoding 600 is performed on the next macroblock, $MB_{i+1}$. In stage x+1 614, the data that the inverse quantizer 308 works on are the quantized transform coefficients of $MB_i$ extracted from the data stream by the PVLD 306 during stage x 612. In an exemplary embodiment of the present invention, also during stage x+1 614, the pixel filter reference data is fetched for $MB_i$ (function 606) using the pixel filter reference fetch address calculated by the core processor 302 during stage x 612.

Then, at stage x+2 616, the inverse transform module 309 performs inverse transform operations 604 on the $MB_i$ transform coefficients that were output by the inverse quantizer 308 during stage x+1. Also during stage x+2, the pixel filter 310 performs pixel filtering 608 for $MB_i$ using the pixel filter reference data fetched in stage x+1 614 and the motion vectors reconstructed by the core processor 302 in stage x 612. Additionally at stage x+2 616, the inverse quantizer 308 works on $MB_{i+1}$ (function 602), the pixel filter reference data is fetched for $MB_{i+1}$ (function 606), and variable length decoding 600 is performed on $MB_{i+2}$.

At stage x+3 618, the motion compensation module 312 performs motion compensation reconstruction 610 on $MB_i$ using decoded difference pixel information produced by the inverse transform module 309 (function 604) and pixel prediction data produced by the pixel filter 310 (function 608) in stage x+2 616. Also during stage x+3 618, the inverse transform module 309 performs inverse transform operations 604 on $MB_{i+h}$ the pixel filter 310 performs pixel filtering 608 for $MB_{i+1}$, the inverse quantizer 308 works on MBi+2 (function 602), the pixel filter reference data is fetched for $MB_{i+2}$ (function 606), and variable length decoding 600 is performed on $MB_{i+3}$. While the pipeline of FIG. 6 shows just four pipeline stages, in an illustrative embodiment of the present invention, the pipeline includes as many stages as is needed to decode a complete incoming data stream.

In an alternative embodiment of the present invention, the functions of two or more hardware modules are combined into one pipeline stage and the macroblock data is processed by all the modules in that stage sequentially. For example, in an exemplary embodiment, inverse transform operations for a given macroblock are performed during the same pipeline stage as IQ operations. In this embodiment, the inverse transform module 309 waits idle until the inverse quantizer 308 finishes and the inverse quantizer 308 becomes idle when the inverse transform operations start. This embodiment will have a longer processing time for the "packed" pipeline stage, and therefore such embodiments may have lower throughput. The benefits of the packed stage embodiment include fewer pipeline stages, fewer buffers and possibly simpler control for the pipeline.

The above-described macroblock-level pipeline advances stage-by-stage. Conceptually, the pipeline advances after all the tasks in the current stage are completed. The time elapsed in one macroblock pipeline stage will be referred to herein as the macroblock (MB) time. In the general case of decoding, the MB time is not a constant and varies from stage to stage according to various factors, such as the amount of processing time required by a given acceleration module to complete processing of a given block of data in a given stage. It depends on the encoded bitstream characteristics and is determined by the bottleneck module, which is the one that finishes last in that stage. Any module, including the core processor 302 itself, could be the bottleneck from stage to stage and it is not pre-determined at the beginning of each stage.

However, for a given encoding/decoding algorithm, each module, including the core processor 302, has a defined and predetermined task or group of tasks to complete. The macroblock time for each module is substantially constant for a given decoding standard. Therefore, in an illustrative embodiment of the present invention, the hardware acceleration pipeline is optimized by hardware balancing each module in the pipeline according to the compression format of the data stream.

The main video decoding operations occur within a direct execution loop that also includes polling of the accelerator functions. The coprocessor/accelerators operate concurrently with the core processor while decoding a series of macro blocks. The core processor 302 controls the pipeline, initiates the decoding of each macro block, and controls the operation of each of the accelerators. The core processor also does a lot of actual decoding, as described in previous paragraphs. Upon completion of each macroblock processing stage in the core processor, firmware checks the status of each of the accelerators to determine completion of previously assigned tasks. In the event that the firmware gets to this point before an accelerator module has completed its required tasks, the firmware polls for completion. This is appropriate, since the pipeline cannot proceed efficiently until all of the pipeline elements have completed the current stage, and an interrupt driven scheme would be less efficient for this purpose. In an alternative embodiment, the core processor 302 is interrupted by the coprocessor or hardware accelerators when an exceptional occurrence is detected, such as an error in the processing task. In another alternative embodiment, the coprocessor or hardware accelerators interrupt the core processor when they complete their assigned tasks.

Each hardware module 306, 308, 309, 310, 312, 313, 315 is independently controllable by the core processor 302. The core processor 302 drives a hardware module by issuing a certain start command after checking the module's status. In one embodiment, the core processor 302 issues the start command by setting up a register in the hardware module.

Figure 7:
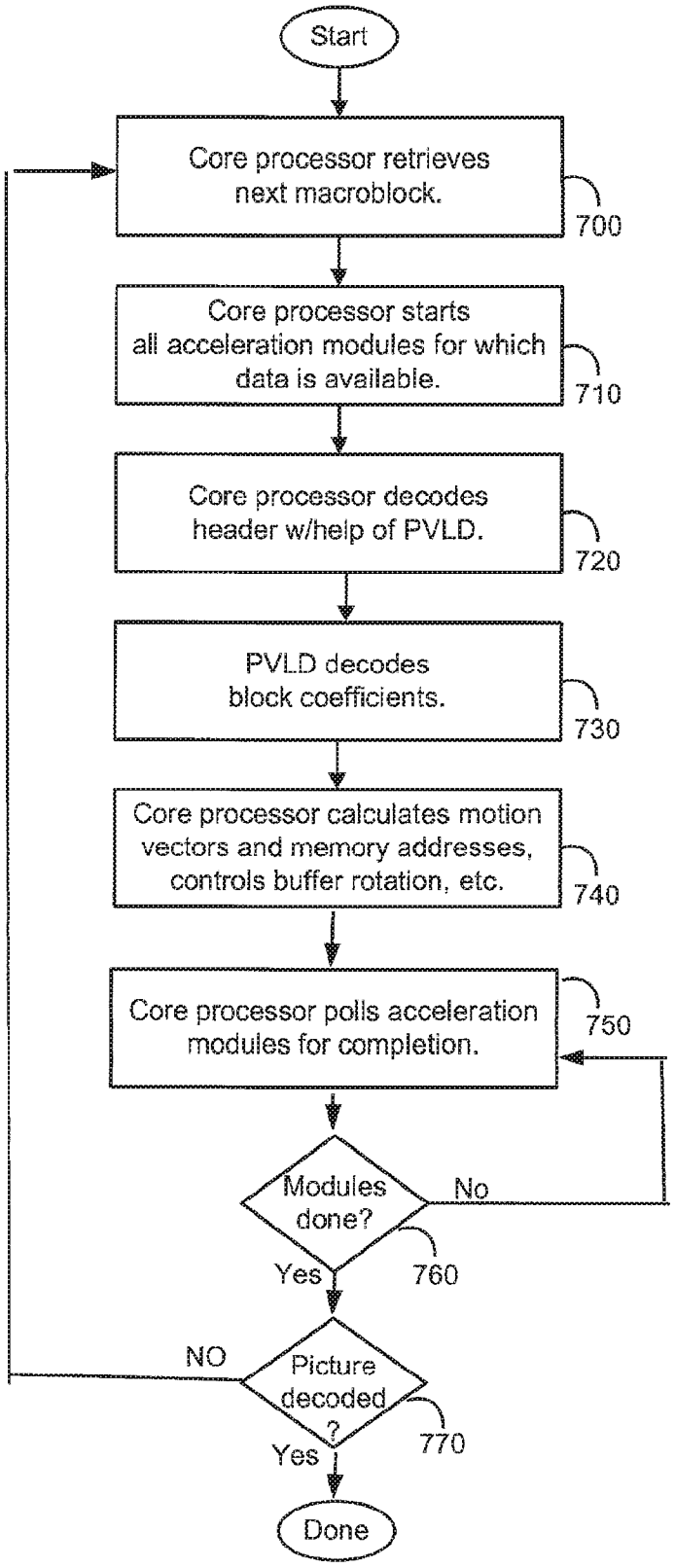
FIG. 7 is a flowchart representing a macroblock decoding loop according to an illustrative embodiment of the present invention.

FIG. 7 is a flowchart representing a macroblock decoding loop according to an illustrative embodiment of the present invention. FIG. 7 depicts the decoding of one video picture, starting at the macro block level. In an illustrative embodiment of the present invention, the loop of macroblock level decoding pipeline control is fully synchronous. At step 700, the core processor 302 retrieves a macroblock to be decoded from system memory 110. At step 710, the core processor starts all the hardware modules for which input data is available. The criteria for starting all modules depends on an exemplary pipeline control mechanism illustrated in FIG. 6. At step 720, the core processor 302 decodes the macroblock header with the help of the PVLD 306. At step 730, when the macroblock header is decoded, the core processor 302 commands the PVLD 306 for block coefficient decoding. At step 740, the core processor 302 calculates motion vectors and memory addresses, such as the pixel filter reference fetch address, controls buffer rotation and performs other housekeeping tasks. At step 750, the core processor 302 checks to see whether the acceleration modules have completed their respective tasks. At decision box 760, if all of the acceleration modules have completed their respective tasks, control passes to decision box 770. If, at decision box 760, one or more of the acceleration modules have not finished their tasks, the core processor 302 continues polling the acceleration modules until they have all completed their tasks, as shown by step 750 and decision box 760. At decision box 770, if the picture is decoded, the process is complete. If the picture is not decoded, the core processor 302 retrieves the next macroblock and the process continues as shown by step 700. In an illustrative embodiment of the present invention, when the current picture has been decoded, the incoming macroblock data of the next picture in the video sequence is decoded according to the process of FIG. 7.

In general, the core processor 302 interprets the bits decoded (with the help of the PVLD 306) for the appropriate headers and sets up and coordinates the actions of the hardware modules. More specifically, all header information, from the sequence level down to the macroblock level, is requested by the core processor 302. The core processor 302 also controls and coordinates the actions of each hardware module. The core processor configures the hardware modules to operate in accordance with the encoding/decoding format of the data stream being decoded by providing operating parameters to the hardware modules. The parameters include but are not limited to (using MPEG2 as an example) the cbp (coded block pattern) used by the PVLD 306 to control the decoding of the transform block coefficients, the quantization scale used by the IQ module 308 to perform inverse quantization, motion vectors used by the pixel filter 309 and motion compensation module 310 to reconstruct the macroblocks, and the working buffer address (es) in decoder memory 316.

Each hardware module 306, 308, 309, 310, 312, 313, 315 performs the specific processing as instructed by the core processor 302 and sets up its status properly in a status register as the task is being executed and when it is done. Each of the modules has or shares a status register that is polled by the core processor to determine the module's status. In an alternative embodiment, each module issues an interrupt signal to the core processor so that in addition to polling the status registers, the core processor can be informed asynchronously of exceptional events like errors in the bitstream. Each hardware module is assigned a set of macroblock buffers in decoder memory 316 for processing purposes. In an illustrative embodiment, each hardware module signals the busy/available status of the working buffer(s) associated with it so that the core processor 302 can properly coordinate the processing pipeline.

In an exemplary embodiment of the present invention, the hardware accelerator modules 306, 308, 309, 319, 312, 313, 314, 315 generally do not communicate with each other directly. The accelerators work on assigned areas of decoder memory 316 and produce results that are written back to decoder memory 316, in some cases to the same area of decoder memory 316 as the input to the accelerator, or results are written back to main memory. In one embodiment of the present invention, when the incoming bitstream is of a format that includes a relatively large amount of data, or of a relatively complex encoding/decoding format, the accelerators in some cases may bypass the decoder memory 316 and pass data between themselves directly.

Software codecs from other sources, such as proprietary codecs, are ported to the decoding system 300 by analyzing the code to isolate those functions that are amenable to acceleration, such as variable-length decoding, run-length coding, inverse scanning, inverse quantization, transform, pixel filter, motion compensation, de-blocking filter, and display format conversion, and replacing those functions with equivalent functions that use the hardware accelerators in the decoding system 300. In an exemplary embodiment of the present invention, modules 310, 312 and 313, 315 are implemented in a programmable SIMD/RISC filter engine module (311 and 314 respectively) that allows execution of a wide range of decoding algorithms, even ones that have not yet been specified in by any standards body. Software representing all other video decoding tasks is compiled to run directly on the core processor.

Figure 8:
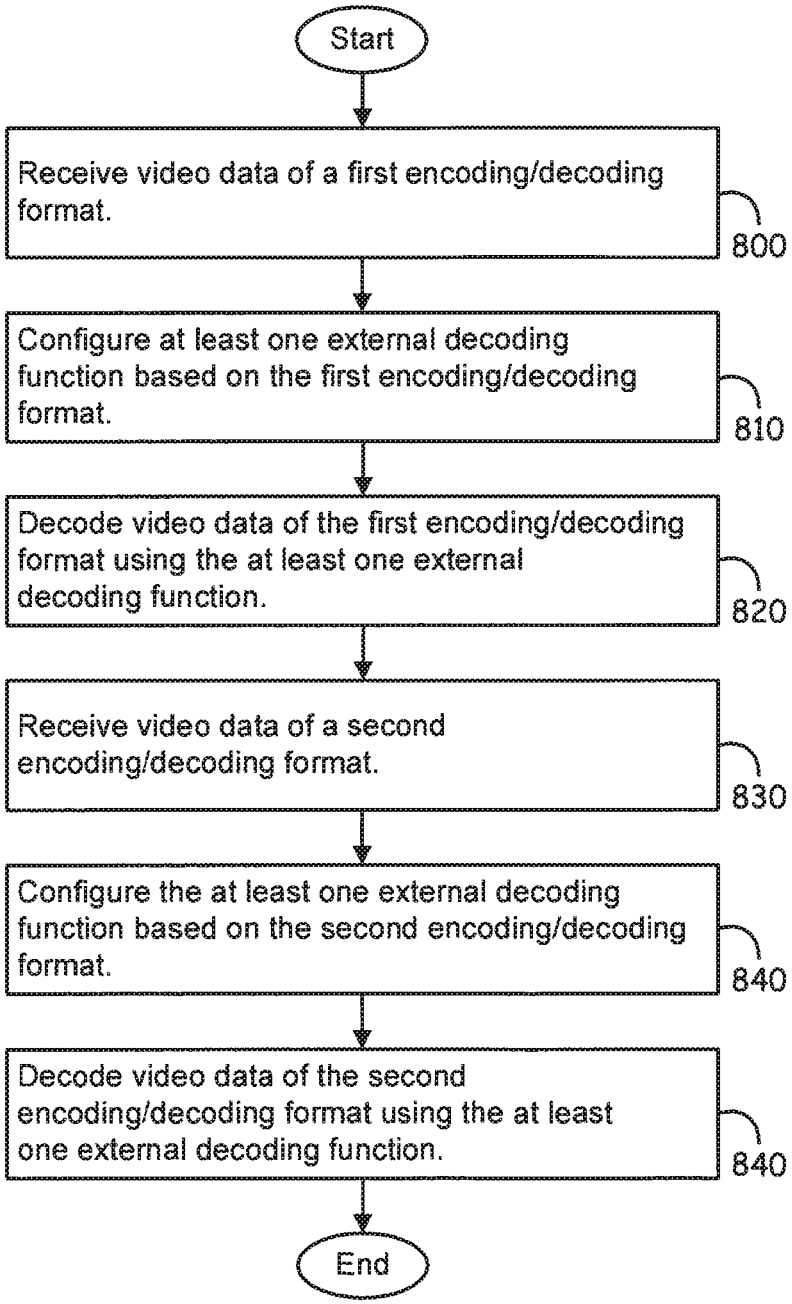
FIG. 8 is a flowchart representing a method of decoding a digital video data stream containing more than one video data format, according to an illustrative embodiment of the present invention.

In an illustrative embodiment of the present invention, some functions are interrupt driven, particularly the management of the display, i.e., telling the display module which picture buffer to display from at each field time, setting display parameters that depend on the picture type (e.g. field or frame), and performing synchronization functions. The decoding system 300 of the present invention provides flexible configurability and programmability to handle different video stream formats. FIG. 8 is a flowchart representing a method of decoding a digital video data stream or set of streams containing more than one video data format, according to an illustrative embodiment of the present invention. At step 800, video data of a first encoding/decoding format is received. At step 810, at least one external decoding function, such as variable-length decoding or inverse quantization: is configured based on the first encoding/decoding format. At step 820, video data of the first encoding/decoding format is decoded using the at least one external decoding function. In an illustrative embodiment of the present invention, a full picture, or a least a full row, is processed before changing formats and before changing streams. At step 830, video data of a second encoding/decoding format is received. At step 840, at least one external decoding function is configured based on the second encoding/decoding format. Then, at step 850, video data of the second encoding/decoding format is decoded using the at least one external decoding function. In an exemplary embodiment, the at least one decoding function is performed by one or more of hardware accelerators 306, 308, 309, 310, 312, 313, 314 and 315. The hardware accelerators are programmed or configured by the core processor 302 to operate according to the appropriate encoding/decoding format. As is described above with respect to the individual hardware accelerators of FIGS. 3 and 4, in one illustrative embodiment the programming for different decoding formats is done through register read/write. The core processor programs registers in each module to modify the operational behavior of the module.

In another illustrative embodiment, some or all of the hardware accelerators comprise programmable processors which are configured to operate according to different encoding/decoding formats by changing the software executed by those processors, in addition to programming registers as appropriate to the design. Although a preferred embodiment of the present invention has been described, it should not be construed to limit the scope of the appended claims. For example, the present invention is applicable to any type of media, including audio, in addition to the video media illustratively described herein. Those skilled in the art will understand that various modifications may be made to the described embodiment. Moreover, to those skilled in the various arts, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention.

What is claimed is:

1. A method of decoding a digital media data stream, comprising:

(a) receiving media data of a first encoding/decoding format;

(b) configuring at least one external decoding function based on the first encoding/decoding format;

(c) decoding media data of the first encoding/decoding format using the at least one external decoding function;

(d) receiving media data of a second encoding/decoding format;

(e) configuring the at least one external decoding function based on the second encoding/decoding format; and (f) decoding media data of the second encoding/decoding format using the at least one external decoding function,

*wherein decoding media data using the at least one external decoding function in operations (c) and (f) comprises at least one configurable hardware module performing the at least one external decoding function, and wherein configuring the at least one external decoding function in operations (b) and (e) comprises configuring the at least one configurable hardware module,*

*wherein the at least one configurable hardware module is a plurality of configurable hardware modules, and wherein each of the plurality of configurable hardware modules performs at least one decoding function,*

*wherein at least one of the plurality of configurable hardware modules does not include a processor.*

2. The method of claim 1, wherein the digital media data stream is a video stream and the media data is video data.

3. The method of claim 2, wherein the at least one external decoding function is an entropy decoding function.

4. The method of claim 2, wherein the at least one external decoding function is an inverse quantization function.

5. The method of claim 2, wherein the at least one external decoding function is an inverse transform operation.

6. The method of claim 2, wherein the at least one external decoding function is a pixel filtering function.

7. The method of claim 2, wherein the at least one external decoding function is a motion compensation function.

8. The method of claim 2, wherein the at least one external decoding function is a de-blocking operation.

[9. A video decoding method, comprising:

receiving a first video macroblock encoded in a first encoding format;

configuring a first external decoding function based on the first encoding format;

decoding the first video macroblock using the first external decoding function;

receiving a second video macroblock encoded in a second encoding format;

configuring a second external decoding function based on the second encoding format; and decoding the second video macroblock using the second external decoding function.]

[10. The method of claim 9, wherein the first external decoding function is an entropy decoding function.]

[11. The method of claim 9, wherein the first external decoding function is an inverse quantization function.]

[12. The method of claim 9, wherein the first external decoding function is an inverse transform operation.]

[13. The method of claim 9, wherein the first external decoding function is a pixel filtering function.]

[14. The method of claim 9, wherein the first external decoding function is a motion compensation function.]

[15. The method of claim 9, wherein the first external decoding function is a de-blocking operation.]

[16. The method of claim 9, wherein the second external decoding function is one selected from the group consisting of:

an entropy decoding function;

an inverse quantization function;

an inverse transform operation;

a pixel filtering function;

a motion compensation function; and a de-blocking operation.]

[17. A video decoding method, comprising:

determining a data format for a video data stream;

configuring a programmable entropy decoder to perform entropy decoding based on the determined data format;

configuring an inverse quantizer to perform an inverse quantization based on the determined data format;

configuring an inverse transform accelerator to perform an inverse transform operations based on the determined data format;

configuring a pixel filter to perform a pixel filtering based on the determined data format;

configuring a motion compensator to perform a motion compensation based on the determined data format; and configuring a de-blocking filter to perform a de-blocking operation based on the determined data format.]

[18. The method of claim 17, wherein the video data stream comprises a digital video image.]

[19. The method of claim 18, wherein the digital video image comprises macroblocks.]

[20. The method of claim 17, further comprising determining a second data format for a second video data stream; and configuring at least one of the programmable entropy decoder, inverse quantizer, inverse transform accelerator, pixel filter, motion compensator, and de-blocking filter to perform operations based on the determined second data format.]

*21. The method of claim 1, wherein the plurality of configurable hardware modules comprises two or more configurable hardware modules selected from the group consisting of:*

*an inverse quantizer adapted to perform inverse quantization on the digital media data stream;*

*an inverse transform accelerator adapted to perform inverse transform operations on the digital media data stream;*

*a pixel filter adapted to perform pixel filtering on the digital media data stream;*

*a motion compensator adapted to perform motion compensation on the digital media data stream; and*

*a de-blocking filter adapted to perform a de-blocking operation on the digital media data stream.*

*22. The method of claim 1, wherein the plurality of configurable hardware modules comprises four or more configurable hardware modules selected from the group consisting of:*

*an inverse quantizer adapted to perform inverse quantization on the digital media data stream;*

*an inverse transform accelerator adapted to perform inverse transform operations on the digital media data stream;*

*a pixel filter adapted to perform pixel filtering on the digital media data stream;*

*a motion compensator adapted to perform motion compensation on the digital media data stream; and*

*a de-blocking filter adapted to perform a de-blocking operation on the digital media data stream.*

*23. The method of claim 1, wherein the plurality of configurable hardware modules comprises:*

*an inverse quantizer adapted to perform inverse quantization on the digital media data stream;*

*an inverse transform accelerator adapted to perform inverse transform operations on the digital media data stream;*

*a pixel filter adapted to perform pixel filtering on the digital media data stream;*

*a motion compensator adapted to perform motion compensation on the digital media data stream; and*

*a de-blocking filter adapted to perform a de-blocking operation on the digital media data stream.*

*24. The method of claim 1, wherein the plurality of configurable hardware modules comprises three or more configurable hardware modules selected from the group consisting of:*

*an inverse quantizer adapted to perform inverse quantization on the digital media data stream;*

*an inverse transform accelerator adapted to perform inverse transform operations on the digital media data stream;*

*a pixel filter adapted to perform pixel filtering on the digital media data stream;*

*a motion compensator adapted to perform motion compensation on the digital media data stream; and*

*a de-blocking filter adapted to perform a de-blocking operation on the digital media data stream.*

*25. A method of decoding a digital media data stream, comprising:*

*(a) receiving media data of a first encoding/decoding format;*

*(b) configuring at least one external decoding function based on the first encoding/decoding format;*

(c) *decoding media data of the first encoding/decoding format using the at least one external decoding function;*

(d) *receiving media data of a second encoding/decoding format;*

(e) *configuring the at least one external decoding function based on the second encoding/decoding format; and*

(f) *decoding media data of the second encoding/decoding format using the at least one external decoding function,*

*wherein decoding media data using the at least one external decoding function in operations (c) and (f) comprises at least one configurable hardware module performing the at least one external decoding function, and wherein configuring the at least one external decoding function in operations (b) and (e) comprises configuring the at least one configurable hardware module,*

*wherein the at least one configurable hardware module is a plurality of configurable hardware modules, and wherein each of the plurality of configurable hardware modules performs at least one decoding function,*

*wherein none of the plurality of configurable hardware modules includes a processor.*

*26. The method of claim 24, wherein at least one of the plurality of configurable hardware modules is a hardware accelerator.*

*27. A method of decoding a digital media data stream, comprising:*

(a) *receiving media data of a first encoding/decoding format;*

(b) *configuring at least one external decoding function based on the first encoding/decoding format;*

(c) *decoding media data of the first encoding/decoding format using the at least one external decoding function;*

(d) *receiving media data of a second encoding/decoding format;*

(e) *configuring the at least one external decoding function based on the second encoding/decoding format; and*

(f) *decoding media data of the second encoding/decoding format using the at least one external decoding function,*

*wherein decoding media data using the at least one external decoding function in operations (c) and (f) comprises at least one configurable hardware module performing the at least one external decoding function, and wherein configuring the at least one external decoding function in operations (b) and (e) comprises configuring the at least one configurable hardware module,*

*wherein the at least one configurable hardware module is a plurality of configurable hardware modules, and wherein each of the plurality of configurable hardware modules performs at least one decoding function,*

*wherein each of the configurable hardware modules is separate from others of the plurality of configurable hardware modules.*

*28. The method of claim 24, wherein the plurality of configurable hardware modules runs in parallel according to a processing pipeline.*

*29. The method of claim 28, further comprising, dictating, by a core decoding processor, the processing pipeline.*

*30. The method of claim 24, wherein a core decoding processor programs a register for at least one of the configurable hardware modules.*

*31. A method of decoding a digital media data stream, comprising:*

(a) *receiving media data of a first encoding/decoding format;*

(b) *configuring at least one external decoding function based on the first encoding/decoding format;*

(c) *decoding media data of the first encoding/decoding format using the at least one external decoding function;*

(d) *receiving media data of a second encoding/decoding format;*

(e) *configuring the at least one external decoding function based on the second encoding/decoding format; and*

(f) *decoding media data of the second encoding/decoding format using the at least one external decoding function,*

*wherein decoding media data using the at least one external decoding function in operations (c) and (f) comprises at least one configurable hardware module performing the at least one external decoding function, and wherein configuring the at least one external decoding function in operations (b) and (e) comprises configuring the at least one configurable hardware module,*

*wherein the at least one configurable hardware module is a plurality of configurable hardware modules, and wherein each of the plurality of configurable hardware modules performs at least one decoding function,*

*wherein each of the plurality of configurable hardware modules is independently controlled by a core decoding processor,*

*wherein the core decoding processor independently controls each of the plurality of configurable hardware modules by programming a register for each of the plurality of configurable hardware modules.*

* * * * *